(12) United States Patent
Yajima et al.

(10) Patent No.: US 12,325,377 B2
(45) Date of Patent: Jun. 10, 2025

(54) OCCUPANT PROTECTION DEVICE

(71) Applicant: TOYODA GOSEI CO., LTD., Kiyosu (JP)

(72) Inventors: Takatoshi Yajima, Kiyosu (JP); Kenji Kakimoto, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/741,342

(22) Filed: Jun. 12, 2024

(65) Prior Publication Data
US 2024/0425010 A1 Dec. 26, 2024

(30) Foreign Application Priority Data
Jun. 20, 2023 (JP) .................................. 2023-101038

(51) Int. Cl.
*B60R 21/18* (2006.01)
*B60R 21/235* (2006.01)
*B60R 21/26* (2011.01)

(52) U.S. Cl.
CPC .............. *B60R 21/18* (2013.01); *B60R 21/26* (2013.01); *B60R 2021/23519* (2013.01); *B60R 2021/26058* (2013.01)

(58) Field of Classification Search
CPC ..................................................... B60R 21/18
See application file for complete search history.

(56) References Cited

U.S. PATENT DOCUMENTS

| | | | |
|---|---|---|---|
| 3,929,348 A * | 12/1975 | Lawwill ................. | B60R 21/18 280/805 |
| 5,062,662 A * | 11/1991 | Cameron .............. | B60R 21/268 280/801.1 |
| 5,642,902 A * | 7/1997 | France .................... | B60R 21/18 280/733 |
| 6,109,647 A * | 8/2000 | Akaba .............. | B60R 21/01558 280/733 |
| 6,170,863 B1 * | 1/2001 | Takeuchi ................ | B60R 21/18 280/733 |
| 6,336,657 B1 * | 1/2002 | Akaba .............. | B60R 21/01558 280/741 |
| 6,378,898 B1 * | 4/2002 | Lewis .................... | B60R 21/18 280/739 |

(Continued)

FOREIGN PATENT DOCUMENTS

| | | | | |
|---|---|---|---|---|
| CN | 1657348 A | * | 8/2005 | ......... B60N 2/42718 |
| CN | 101213115 A | * | 7/2008 | ............ B60R 21/18 |

(Continued)

*Primary Examiner* — Nicole T Verley
(74) *Attorney, Agent, or Firm* — Posz Law Group, PLC

(57) ABSTRACT

In an occupant protection device, an airbag disposed in a region of a lap belt of a seat belt includes a bag body and a conduit connected to an inflator disposed near a lower end of a seat portion of a seat. The airbag is held by the lap belt in a folded state. The conduit is disposed substantially along the lap belt while being held by a conduit holder. The conduit holder is formed of a material having flexibility and higher rigidity than the conduit, is disposed substantially along the conduit, and has both end sides fixed to a seat side and a bag body side, respectively, by a seat-side fixing portion or a bag body-side fixing portion.

20 Claims, 19 Drawing Sheets

(56) References Cited

U.S. PATENT DOCUMENTS

| | | | | |
|---|---|---|---|---|
| 6,406,058 | B1 * | 6/2002 | Devonport | B60R 21/18 280/733 |
| 6,471,243 | B1 * | 10/2002 | Brown | B60R 21/26 280/808 |
| 7,021,654 | B2 * | 4/2006 | Honda | B60R 21/207 280/730.2 |
| 11,390,232 | B2 * | 7/2022 | Fischer | B60N 2/0025 |
| 11,603,063 | B2 * | 3/2023 | Hayashi | B60R 21/18 |
| 11,691,586 | B2 * | 7/2023 | Fischer | B60R 21/233 280/733 |
| 2002/0125701 | A1 * | 9/2002 | Devonport | B60R 21/18 280/733 |
| 2005/0184491 | A1 * | 8/2005 | Itoga | B60N 2/42718 280/736 |
| 2005/0189749 | A1 * | 9/2005 | Itaoga | B60N 2/42718 280/736 |
| 2016/0059819 | A1 * | 3/2016 | Witt | B60R 21/18 280/733 |
| 2020/0122668 | A1 | 4/2020 | Ozaki et al. | |
| 2021/0300278 | A1 * | 9/2021 | Hayashi | B60R 21/18 |

FOREIGN PATENT DOCUMENTS

| | | | | | |
|---|---|---|---|---|---|
| CN | 112744178 | A | * | 5/2021 | B60N 2/002 |
| CN | 116160988 | A | * | 5/2023 | |
| CN | 116160989 | A | * | 5/2023 | B60R 21/20 |
| DE | 19804365 | A1 | * | 8/1999 | B60R 21/18 |
| EP | 1566307 | A1 | * | 8/2005 | B60N 2/42718 |
| JP | 2002145002 | A | * | 5/2002 | |
| JP | 2005231504 | A | * | 9/2005 | |
| JP | 2007137240 | A | * | 6/2007 | |
| JP | 7243557 | B2 | | 3/2020 | |
| JP | 7342764 | B2 | * | 9/2023 | B60R 21/18 |
| WO | WO-2007099984 | A1 | * | 9/2007 | B60N 2/4221 |

* cited by examiner

FIG. 6
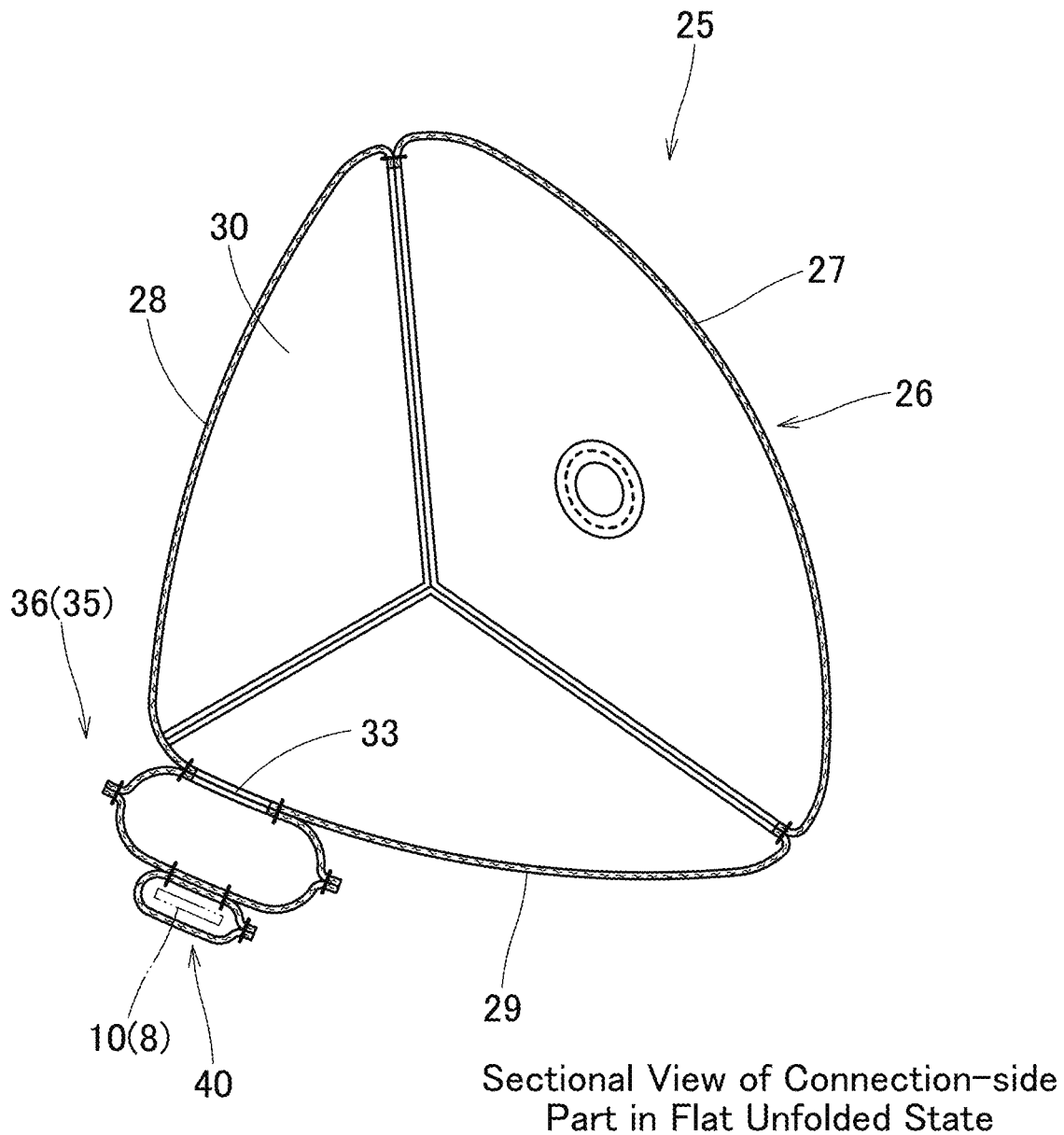
Sectional View of Connection-side Part in Flat Unfolded State
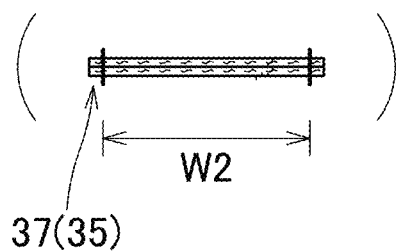

RIGHT ←→ LEFT

FRONT ←→ REAR

FIG. 11A
FIG. 11B
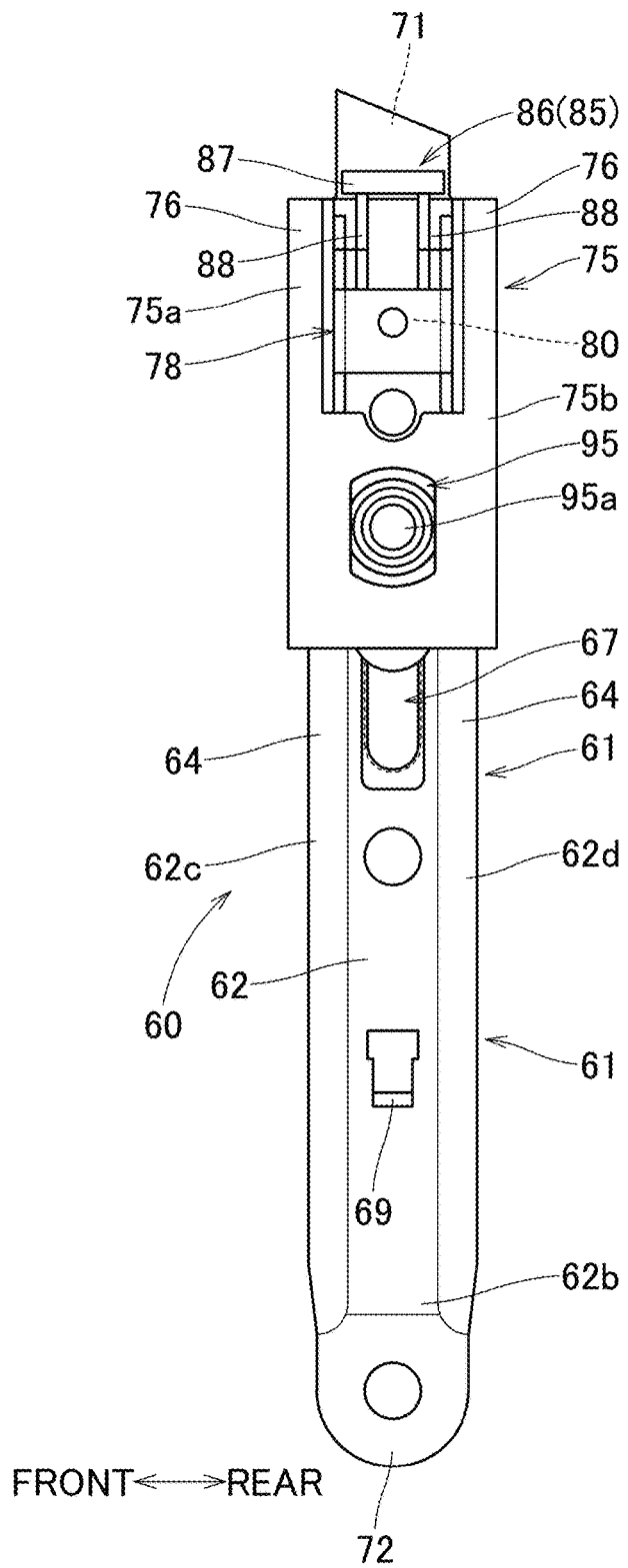
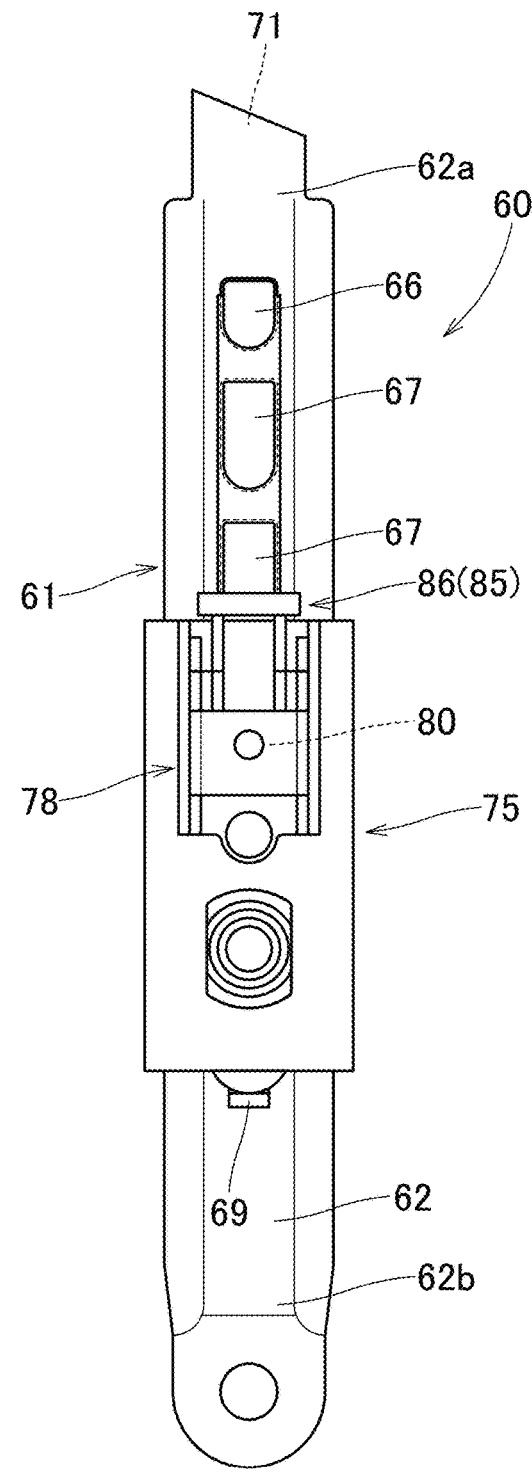

FIG. 12A
FIG. 12B
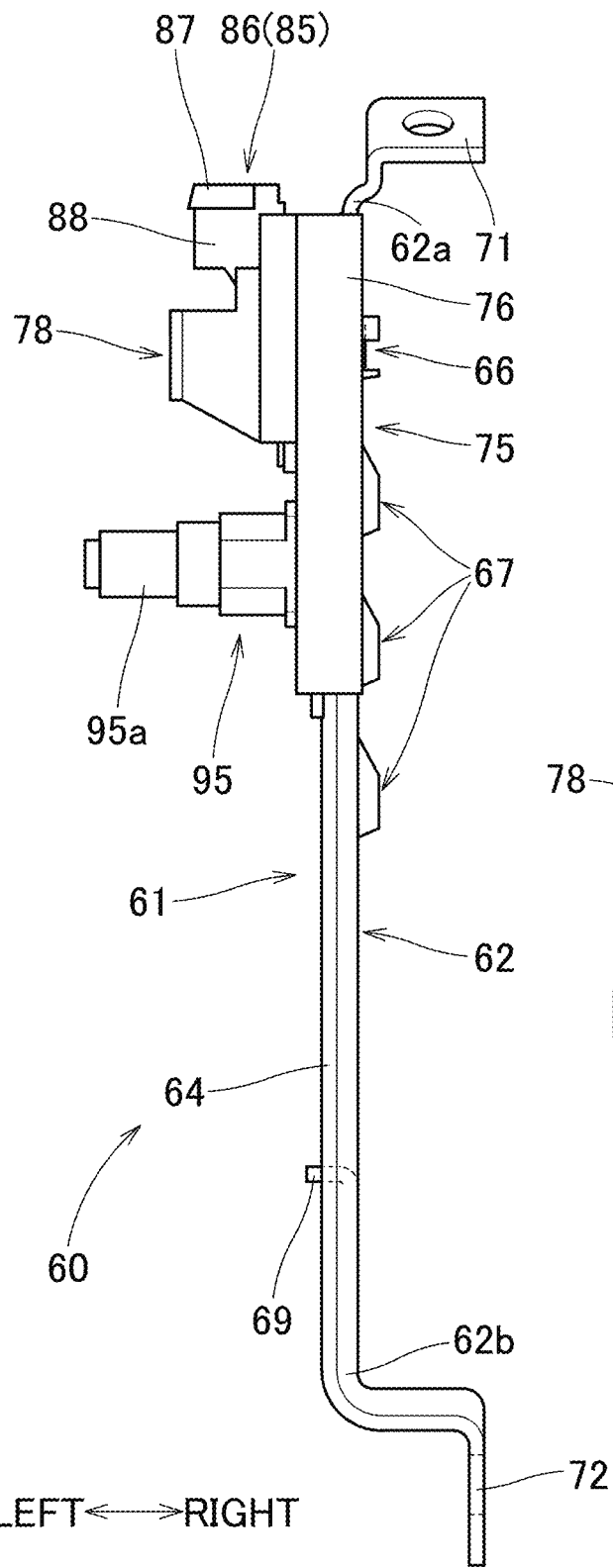
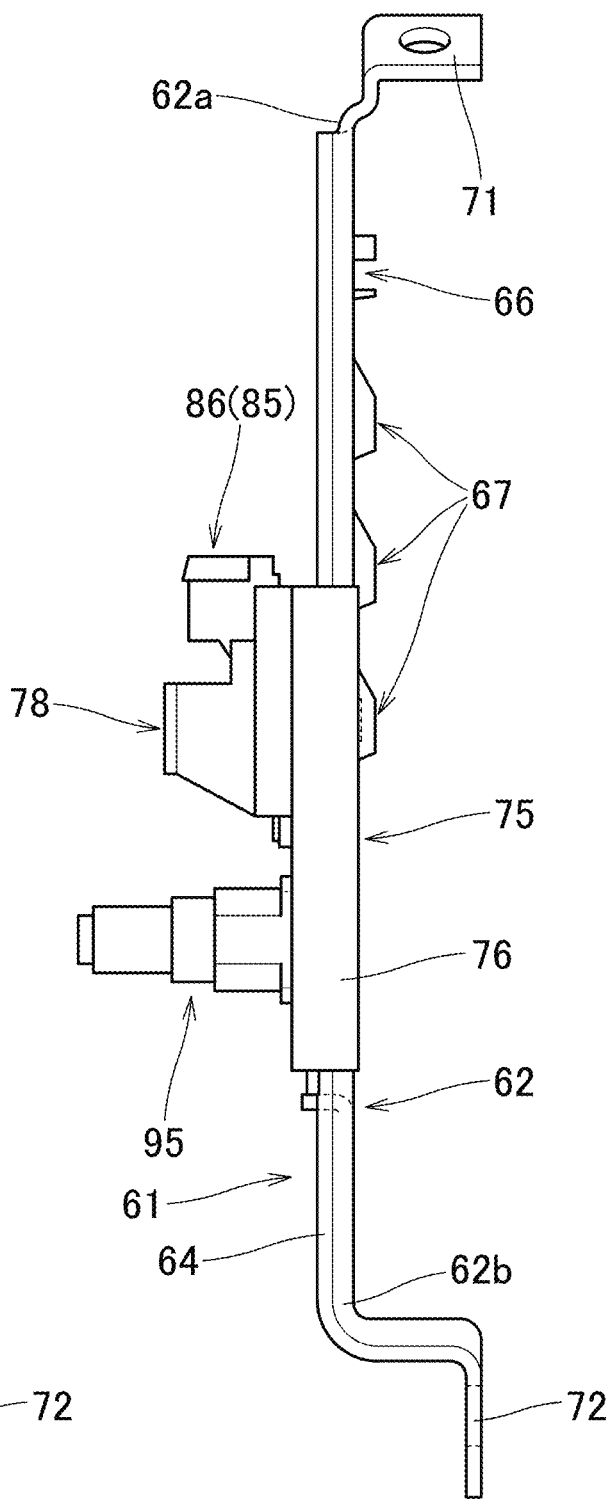

FIG. 13A
FIG. 13B
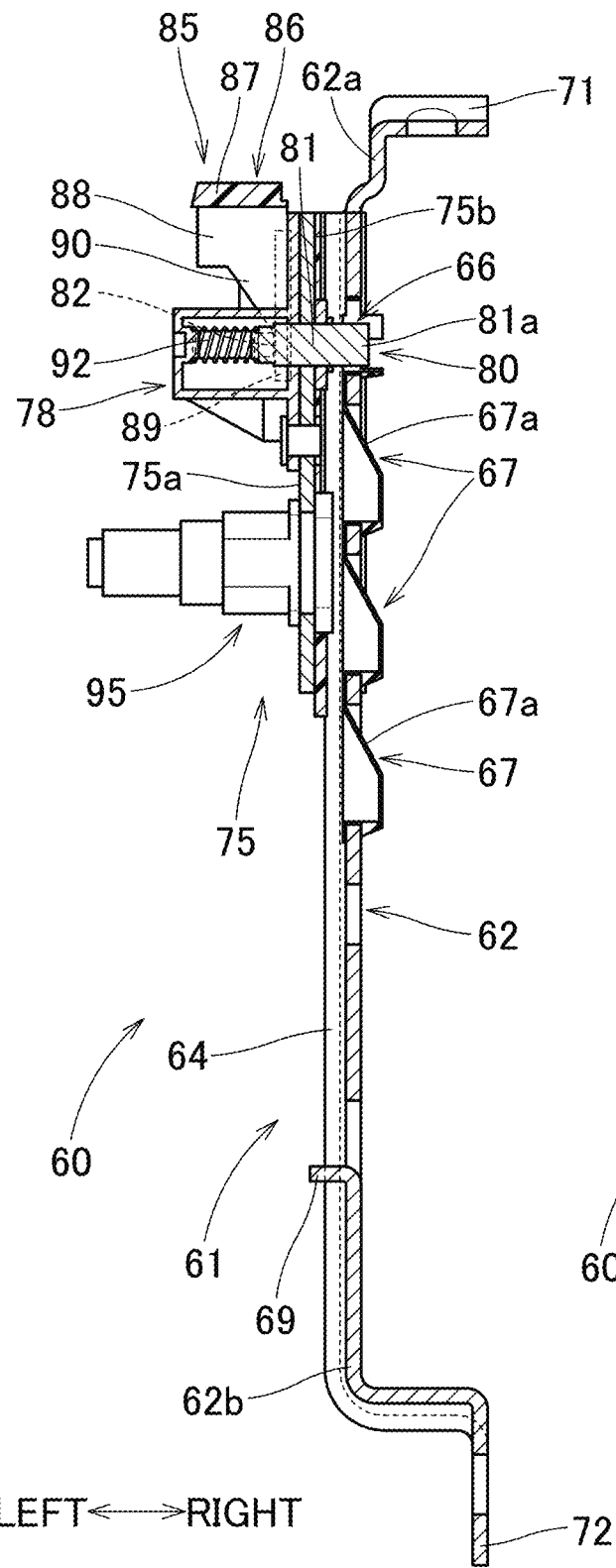
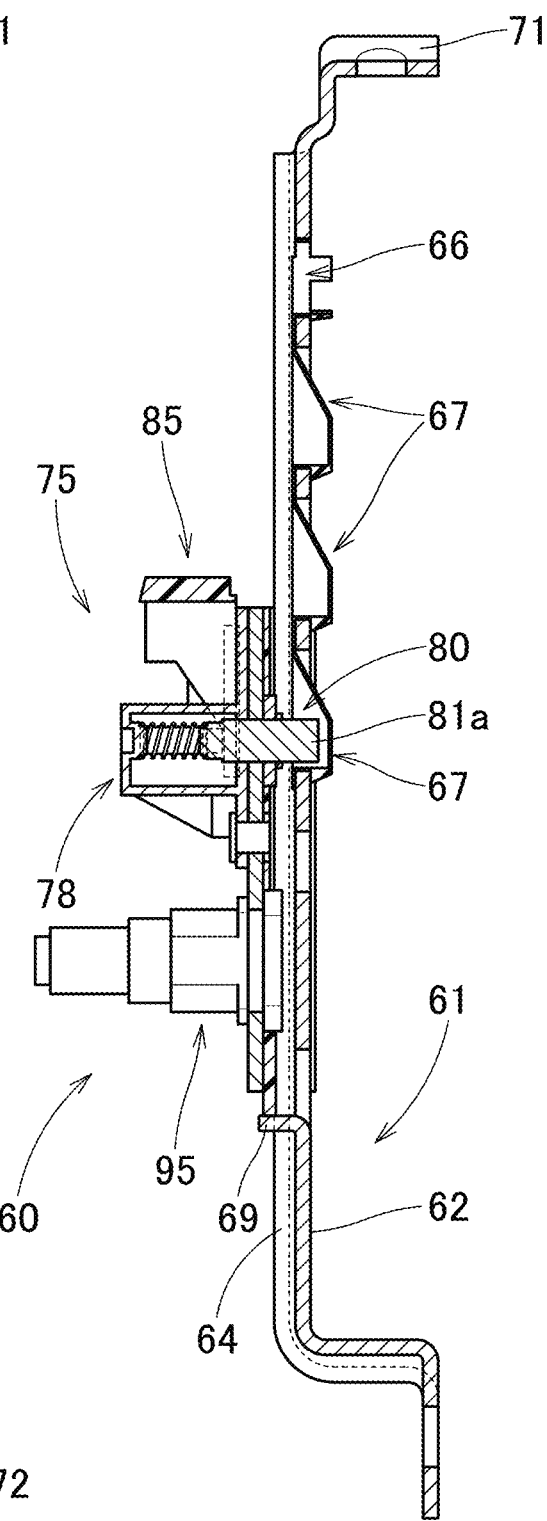
LEFT ←→ RIGHT

FIG. 16
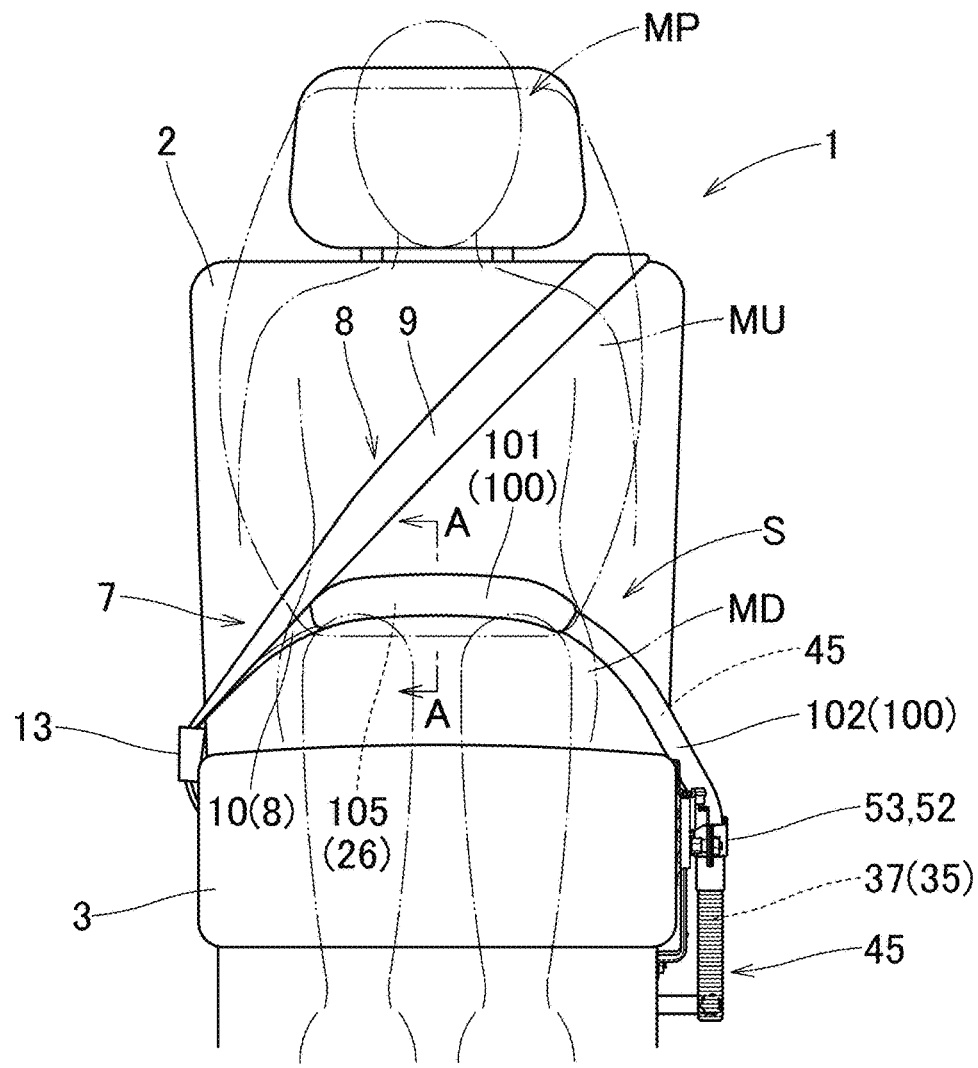
Schematic Partial Sectional View along Line A-A
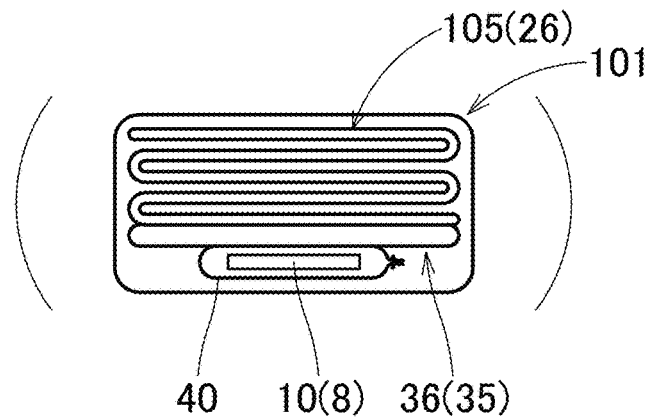

OCCUPANT PROTECTION DEVICE

CROSS REFERENCE TO RELATED APPLICATIONS

The present application claims priority from Japanese Patent Application No. 2023-101038 of Yajima et al., filed on Jun. 20, 2023, the entire disclosures of which are incorporated herein by reference.

BACKGROUND

1. Technical Field

The present disclosure relates to an occupant protection device disposed in a seat of a vehicle.

2. Description of Related Art

Conventionally, as an occupant protection device attached to a seat, as disclosed in Japanese Patent No. 7243557, there has been a configuration in which an airbag is disposed in the region of a lap belt in a seat belt, and during operation, an occupant seated on the seat in a state of wearing the seat belt is protected by an inflated airbag (bag body). In this conventional occupant protection device, an inflator that supplies an inflation gas to the airbag is disposed on the lower end side of a seat portion of the seat. The airbag has a bag body that is held by the lap belt and inflates so as to be able to protect the occupant, and a conduit that is connected to the inflator and allows the inflation gas to flow into the bag body.

In this conventional occupant protection device, the folded bag body (folding completion body) is disposed so as to be held by the lap belt on the distal end side of the conduit disposed substantially along the lap belt while extending from the inflator. However, in the conventional occupant protection device, the conduit disposed between the folding completion body and the inflator has an elongated shape and is formed of a flexible sheet made of the same material as the bag body. Therefore, in a vehicle mounted state (non-wearing state) or the like, the conduit may be twisted together with the lap belt, and there is room for improvement in preventing the occurrence of such twisting and enabling easy wearing.

SUMMARY

An occupant protection device disposed on a seat of a vehicle, including:
a seat belt;
an airbag disposed in a region of a lap belt that restrains a waist of an occupant seated on the seat when the occupant wears the seat belt; and
an inflator disposed at a position near a lower end of a seat portion of the seat and supplies an inflation gas to the airbag,
the airbag having a bag shape formed of a flexible sheet, and including
a bag body that is held by the lap belt in a folded state and inflates to be able to protect the occupant wearing the seat belt, and
a conduit that is connected to the inflator to allow the inflation gas to flow into the bag body,
wherein
the conduit is disposed substantially along the lap belt in a state of being held by a conduit holder, and
the conduit holder is formed of a material having flexibility and higher rigidity than the conduit, is disposed substantially along the conduit, and has both end sides fixed to a seat side and a bag body side, respectively by a seat-side fixing portion or a bag body-side fixing portion.

BRIEF DESCRIPTION OF THE DRAWINGS

FIG. 6 is a schematic longitudinal sectional view of the airbag illustrated in FIG. 5;

FIGS. 11A and 11B are front views (views as viewed from the left in a vehicle mounted state) of the position adjuster used in the occupant protection device according to the embodiment;

FIGS. 12A and 12B are rear views (views as viewed from the rear in the vehicle mounted state) of the position adjuster illustrated FIGS. 11A and 11B;

FIGS. 13A and 13B are longitudinal sectional views of the position adjuster illustrated in FIGS. 11A and 11B;

FIG. 16 is a front view of the seat in a state where the seat belt is worn in the occupant protection device according to the embodiment;

DETAILED DESCRIPTION

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
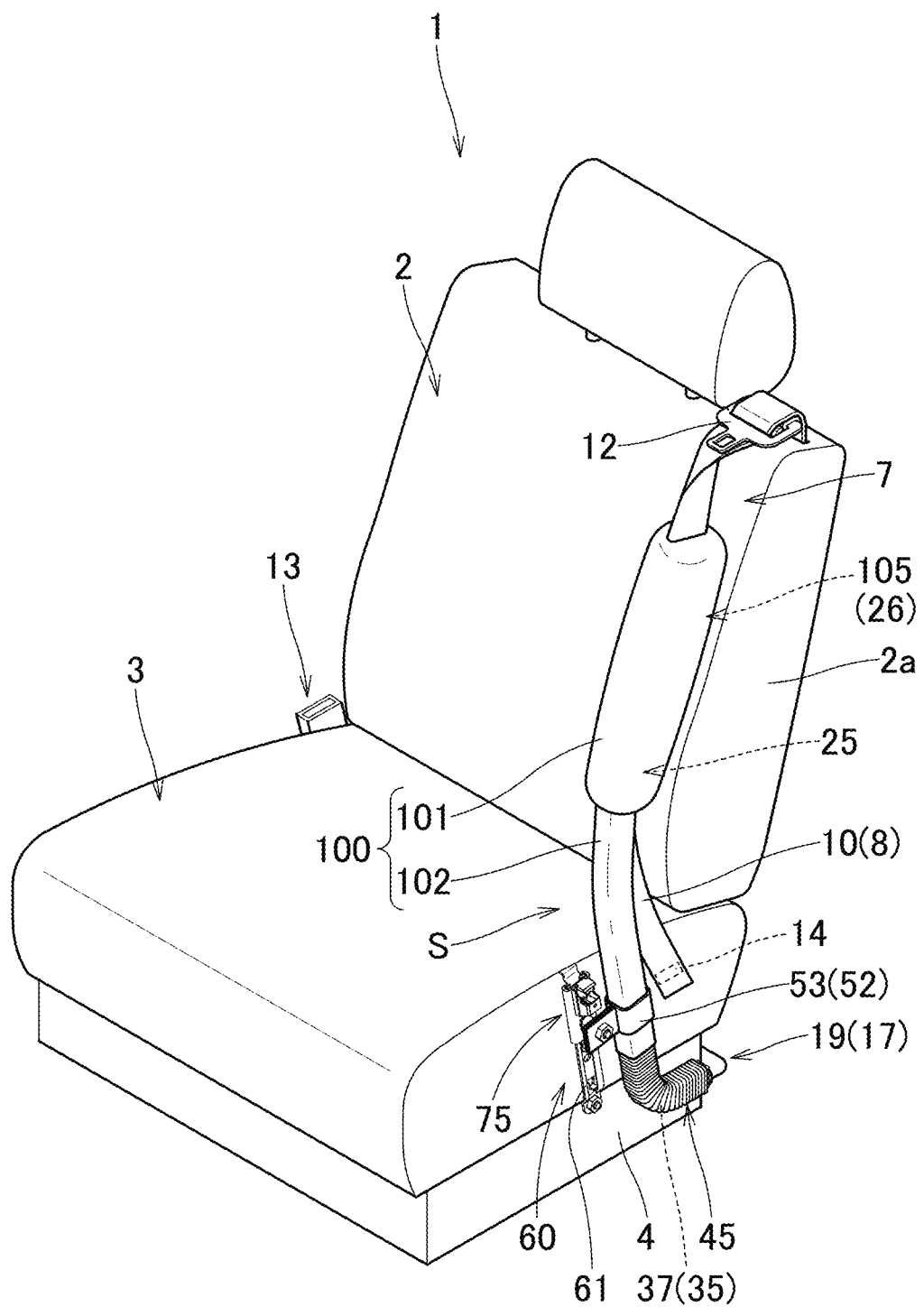
FIG. 1 is a perspective diagram of a seat on which an occupant protection device according to an embodiment of the present disclosure is mounted.
Figure 2:
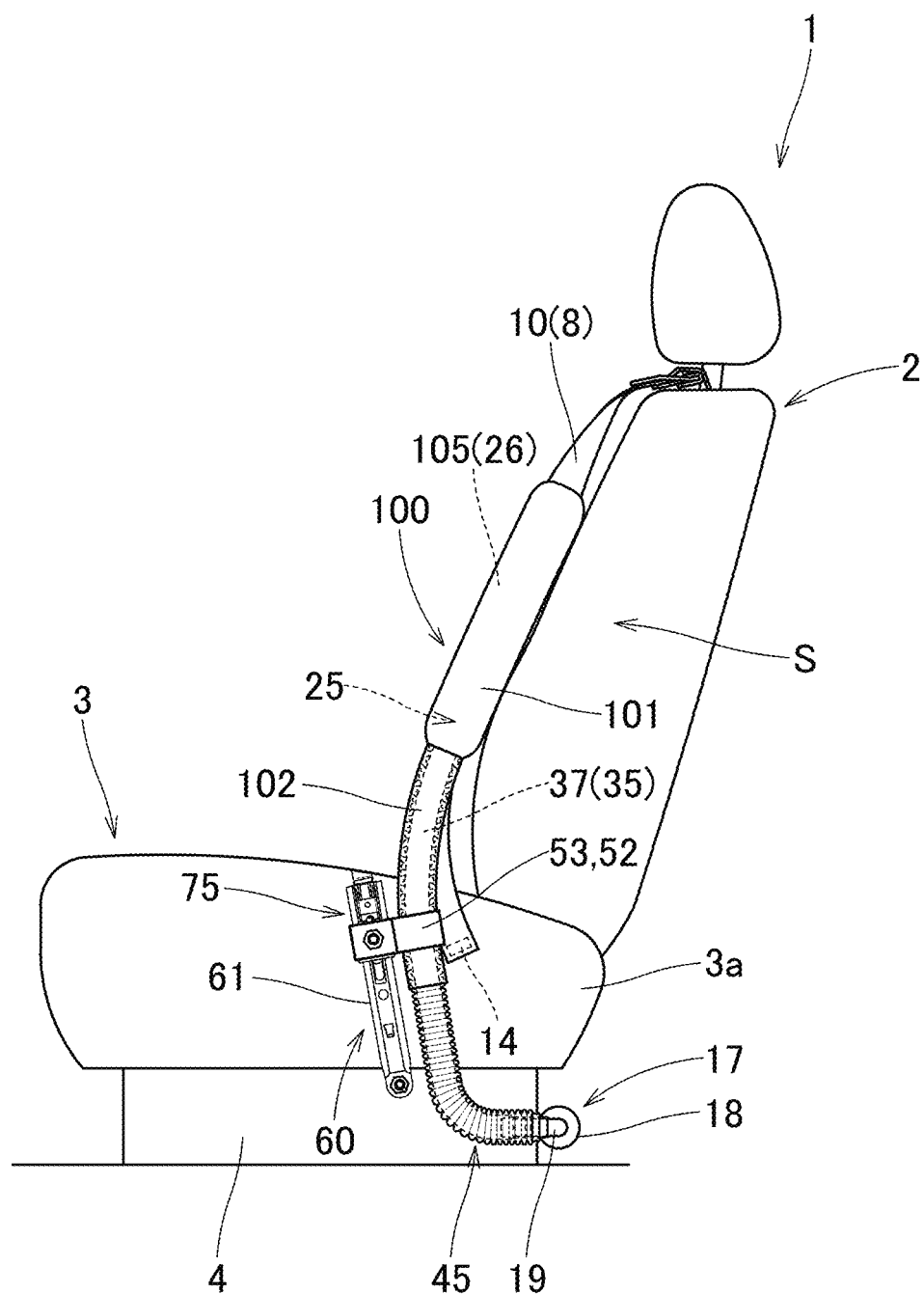
FIG. 2 is a side view of the seat illustrated in FIG. 1.

Hereinafter, an embodiment of the present disclosure will be described with reference to the drawings. As illustrated in FIGS. 1 and 2, an occupant protection device S according to the embodiment is mounted on a seat 1 of a vehicle. The occupant protection device S includes a seat belt 7, an airbag 25, an inflator 17 that supplies an inflation gas to the airbag 25, a conduit holder 45 that holds a conduit 35 to be described later in the airbag 25, a position adjuster 60 that attaches the conduit holder 45 to the seat 1 side, and a cover 100 that covers the periphery (outer side) of the airbag 25. The seat 1 includes a backrest 2 and a seat portion 3. In the embodiment, a description will be given assuming that the front-rear, up-down, and left-right directions match the front-rear, up-down, and left-right directions with respect to an occupant MP seated on the seat 1, unless otherwise specified.

Figure 17:
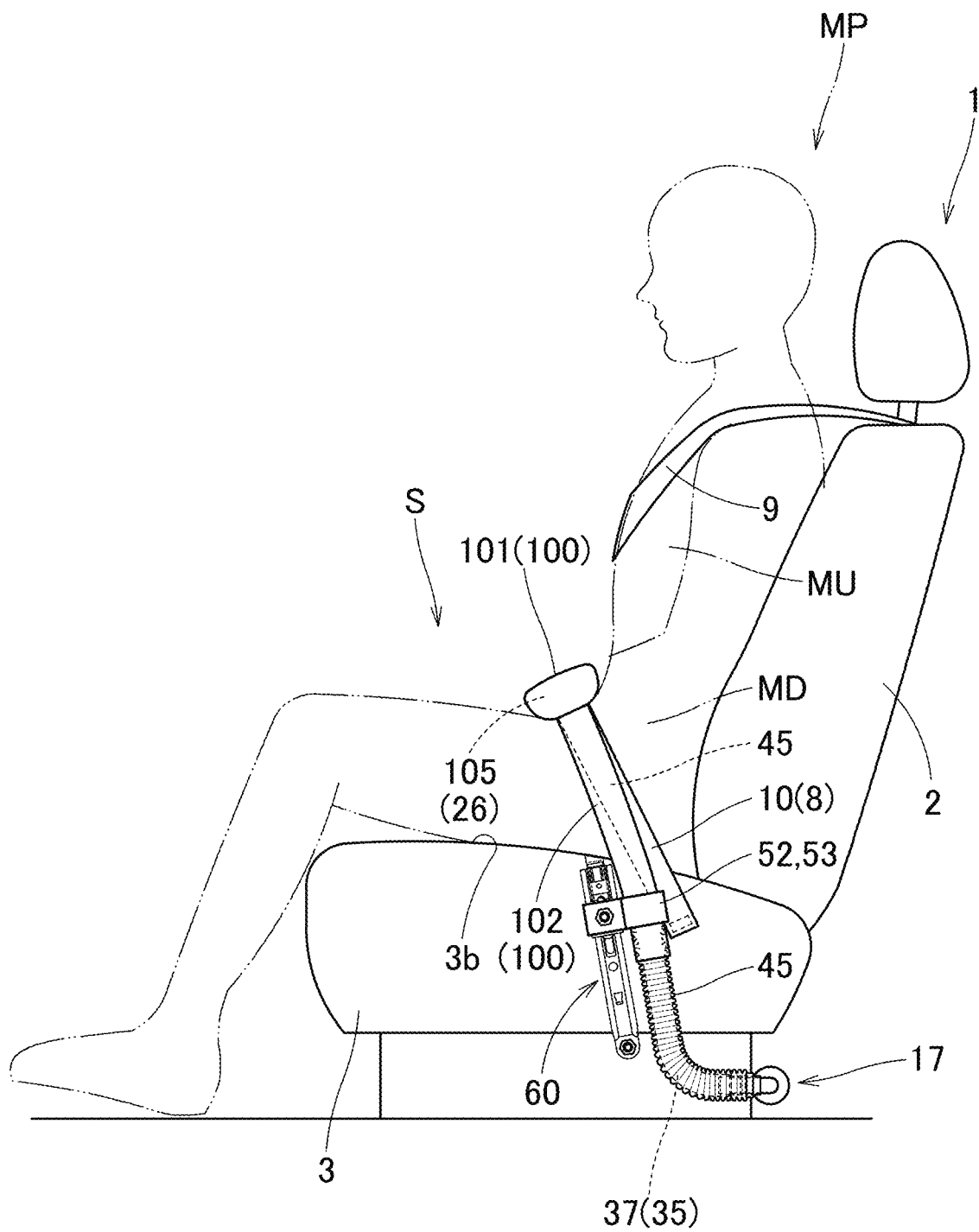
FIG. 17 is a side view of the seat in a state where the seat belt is worn in the occupant protection device according to the embodiment.

In the case of the embodiment, the seat belt 7 is mounted on the seat 1. As illustrated in FIGS. 1, 2, and 16, the seat belt 7 includes a belt body 8 for restraining the occupant MP seated on the seat 1, a tongue plate 12 attached to the belt body 8, and a buckle 13 for the tongue plate 12 to be coupled thereto. In the case of the embodiment, the buckle 13 is disposed on the rear right end side of the seat portion 3 in the seat 1 (the right side of the vicinity of the boundary between the backrest 2 and the seat portion 3) (see FIGS. 1 and 16). One end of the belt body 8 is locked to a winding shaft of a retractor (not illustrated) disposed in the backrest 2, and the other end side thereof is locked to an anchor member 14 (see FIGS. 1 to 3) disposed on the rear left end 3a side of the seat portion 3 in the seat 1, so that the belt body 8 can be unreeled from the retractor at the time of wearing. Specifically, the belt body 8 is disposed so as to be exposed to the outside from the upper end left edge side of the backrest 2. In the case of the embodiment, the belt body 8 is configured to expose a lap belt 10 on which the airbag 25 is disposed to the front surface of the backrest 2 in a non-seated state of the occupant MP, as illustrated in FIG. 1. Specifically, in the non-seated state of the occupant MP, as illustrated in FIG. 1, the lap belt 10 is exposed to the front surface of the backrest 2 substantially along the vertical direction on the left edge side of the backrest 2. The belt body 8 includes the lap belt 10 and a shoulder belt 9 housed in the backrest 2. The belt body 8 is configured to restrain a lower body MD (the waist, a pelvic region) of the occupant MP by the lap belt 10 disposed substantially along the left-right direction between the anchor member 14 and the buckle 13, and restrain an upper body MU (from the shoulder to the chest) of the occupant MP by the shoulder belt 9 extending from the upper end left edge side of the backrest 2 and obliquely disposed toward the buckle 13 in a state where the tongue plate 12 is fastened to the buckle 13 when the occupant is seated (see FIGS. 16 and 17). In the seat belt 7, a retractor (not illustrated) disposed in the backrest 2 has a pretensioner mechanism.

Figure 3:
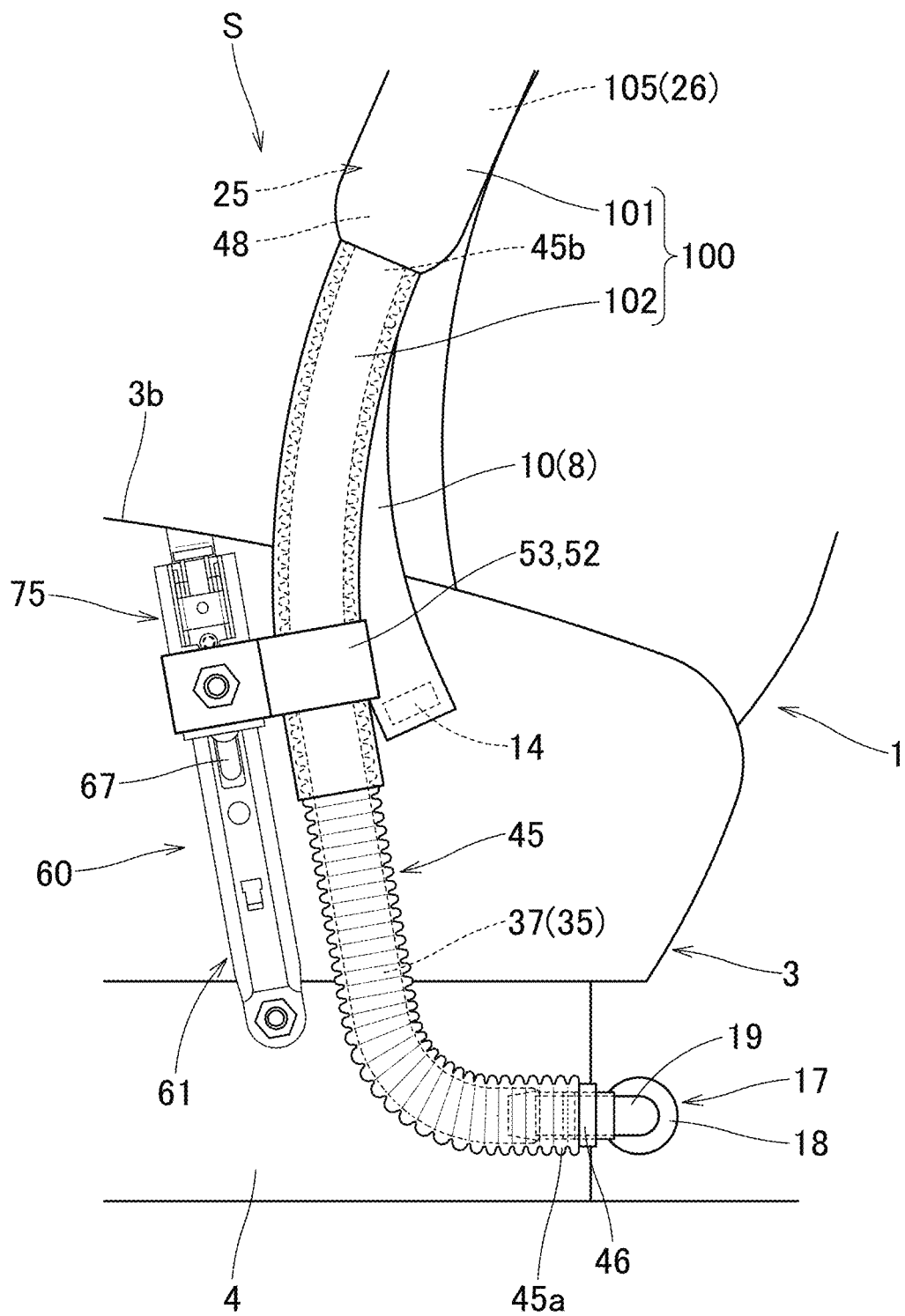
FIG. 3 is a partially enlarged side view illustrating the vicinity of the arrangement part of an inflator and a position adjuster in the seat of FIG. 1.
Figure 4:
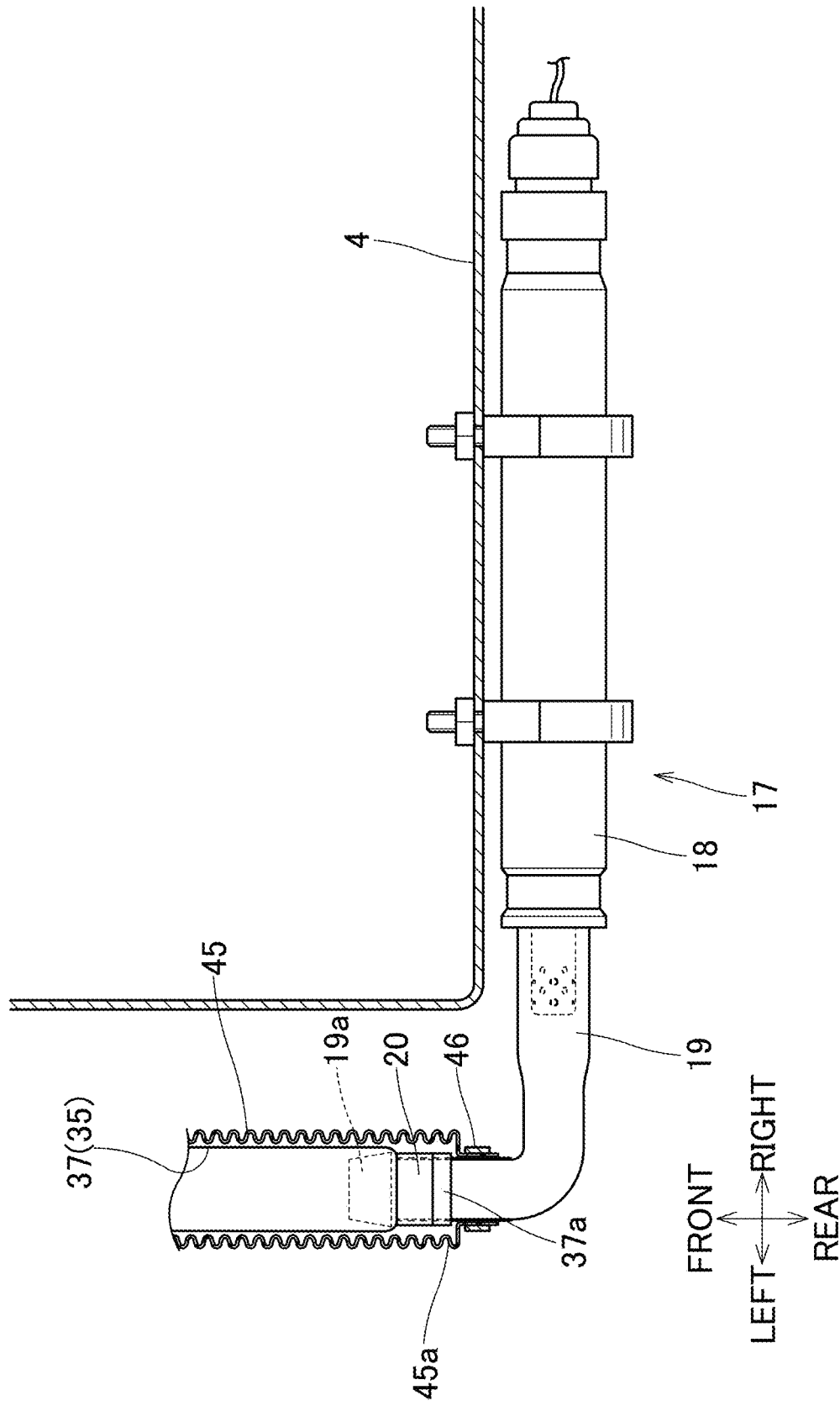
FIG. 4 is a partially enlarged transverse sectional view illustrating the vicinity of the arrangement part of the inflator in the seat of FIG. 1.

The inflator 17 is disposed at a position in the vicinity of the lower end of the seat portion 3 in the seat 1, and is attached to the seat 1 in the case of the embodiment. Specifically, as illustrated in FIGS. 2 and 3, the inflator 17 is disposed at a position below the seat portion 3 on the back surface side of the seat 1. The inflator 17 includes an inflator body 18 having a substantially cylindrical shape disposed substantially along the left-right direction as an axial direction, and a connecting pipe 19 extending from the inflator body 18 and connected to the conduit 35 of the airbag 25 (see FIG. 4). In the case of the embodiment, the inflator body 18 is attached to a seat frame 4 using a predetermined bracket (not illustrated) in a region on the lower side of the back surface of the seat portion 3 in the seat 1. The connecting pipe 19 is disposed so as to be bent while extending from the inflator body 18 and to position a distal end 19a to the left of the seat frame 4. The distal end 19a of the connecting pipe 19 is connected to a distal end 37a (left end) of the conduit 35 in the airbag 25 using a clamp 20 (see FIG. 4). In the case of the embodiment, the inflator body 18 is set so as to start the operation later than the pretensioner mechanism of the seat belt 7 in order to regulate the pull-out of the belt body 8 of the seat belt 7 accompanying the inflation of the airbag 25.

Figure 5:
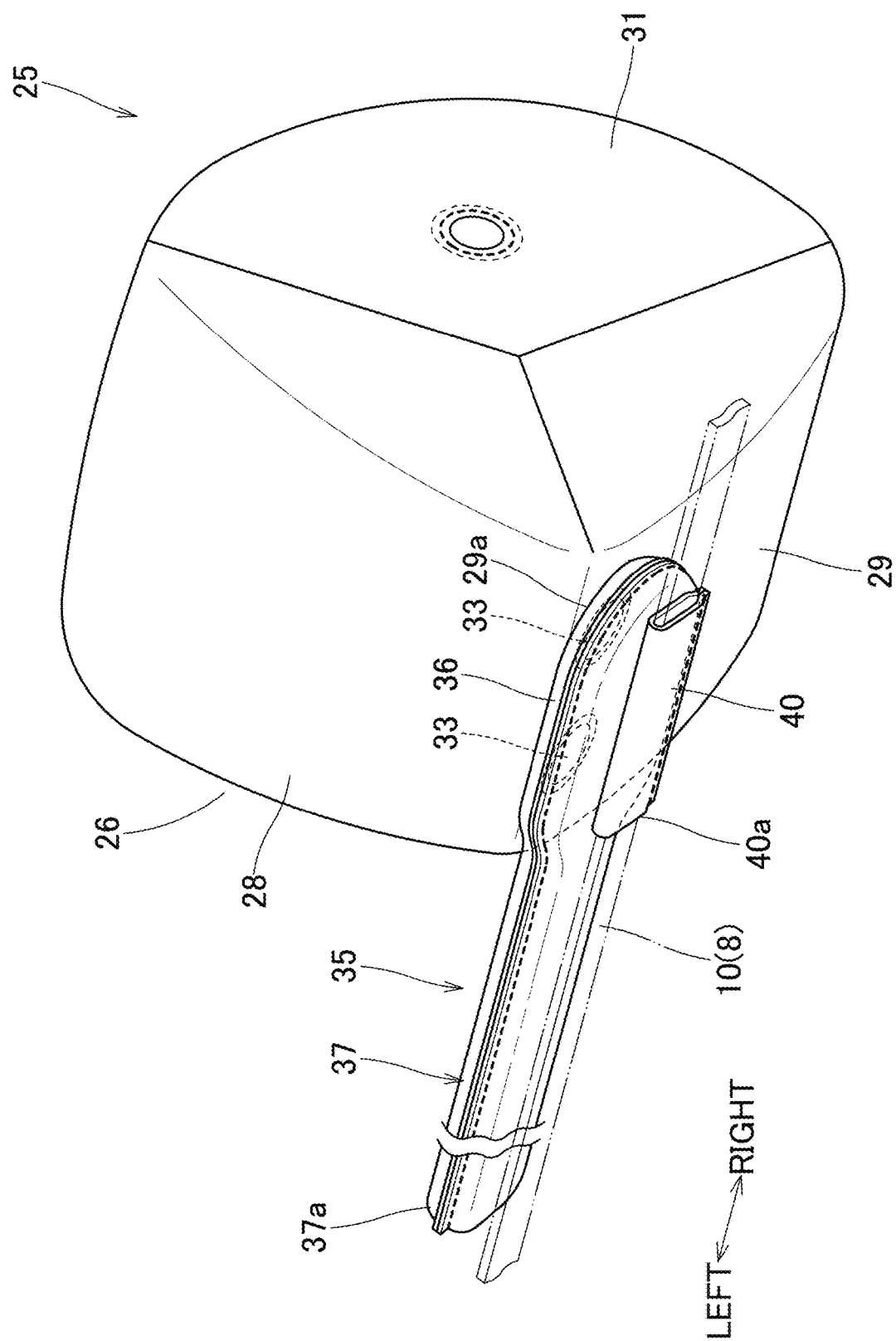
FIG. 5 is a schematic perspective diagram illustrating a state where an airbag used in the occupant protection device according to the embodiment is inflated alone.

The airbag 25 has a bag shape formed of a flexible sheet. As illustrated in FIGS. 5 and 6, the airbag 25 includes a bag body 26 that inflates so as to protect the occupant MP wearing the seat belt 7, the conduit 35 that is connected to the inflator 17 and allows the inflation gas to flow into the bag body 26, and a belt loop 40 through which the lap belt 10 can be inserted. In the embodiment, the airbag 25 (the bag body 26, the conduit 35, and the belt loop 40) is formed of a flexible woven fabric made of a polyester yarn, a polyamide yarn, or the like.

The outer shape of the bag body 26 at the time of completion of inflation is a substantially triangular prism shape in which the axial direction is substantially along the left-right direction. Specifically, the inflation completed shape when viewed from the left and right sides of the bag body 26 is a substantially right triangular shape having an oblique side on the front side (see FIG. 19). In addition, the inflation completed shape when viewed from the front-rear direction side of the bag body 26 is a substantially rectangular shape with a wide width in the vertical direction (see FIG. 18). As illustrated in FIGS. 5 and 6, the bag body 26 includes a rear wall 28 disposed on the occupant MP side (the rear side) when the inflation is completed, a front wall 27 disposed to face the rear wall 28 on the front-rear direction side, a lower wall 29 disposed on the lower end side when the inflation is completed, and a left wall 30 and a right wall 31 arranged to face each other on the left-right direction side when the inflation is completed. The bag body 26 is configured to receive the upper body MU of the occupant MP by the rear wall 28 when the inflation is completed, and is configured to receive the occupant MP by bringing the lower wall 29 into contact with a thigh MT of the occupant MP and causing the thigh MT to support the lower wall 29 when the upper body MU is received by the rear wall 28 (see FIG. 19). The conduit 35 is coupled to the lower surface side of a rear end 29a of the lower wall 29 in the bag body 26. The bag body 26 is configured to allow the inflation gas from the inflator 17 to flow into the inside through the conduit 35. In the region on the rear end 29a side in the lower wall 29, a communication hole 33 communicating with the conduit 35 is opened in a circular shape, and in the case of the embodiment, two communication holes are arranged side by side on the left-right direction side (see FIG. 5). The bag body 26 is coupled to the conduit 35 at a circumferential part of the communication hole 33.

The conduit 35 is disposed so as to extend from the lower surface side of the bag body 26 to the left in the case of the embodiment, and is connected to the inflator 17 (specifically, the connecting pipe 19 of the inflator 17). The original portion side (the right end side) of the conduit 35, which is the bag body 26 side, is closed. The distal end side (the left end side) of the conduit 35 is opened so as to be connectable to the connecting pipe 19. Specifically, as illustrated in FIG. 5, the conduit 35 includes a wide body-side part 36 located on the lower surface side of the bag body 26 and a connection-side part 37 extending leftward from the bag body 26 when the inflation is completed. The connection-side part 37 is formed to be narrower than the body-side part 36. The conduit 35 is configured to be disposed substantially along the left-right direction so as to be substantially along the lap belt 10 when the inflation of the airbag 25 is completed (see FIGS. 18 and 19). The distal end 37a side (the left end side) of the connection-side part 37 in the conduit 35 is connected to the connecting pipe 19 of the inflator 17 using the clamp 20 as described above (see FIG. 4). In the case of the embodiment, the connection-side part 37 of the conduit 35 is held by the conduit holder 45. Specifically, as illustrated in FIGS. 4, 8 to 10, and 14, the connection-side part 37 is disposed while being held by the conduit holder 45 in a manner that the outer peripheral side is covered by the conduit holder 45 (inserted into the conduit holder 45) over substantially the entire length.

As illustrated in FIGS. 5 and 6, the belt loop 40 is disposed on the lower surface side of the body-side part 36 in the conduit 35 (that is, the region below the bag body 26). The belt loop 40 has a substantially tubular shape disposed substantially along the left-right direction so as to be substantially along the lap belt 10, and is configured to allow the lap belt 10 to be inserted therethrough. By inserting the lap belt 10 through the belt loop 40, the bag body 26 is configured to be held by the lap belt 10.

In the embodiment, the airbag 25 is configured to be held by the lap belt 10 so as to be displaceable with respect to the lap belt 10 in a state of a folding completion body 105 formed by folding the region of the bag body 26 into an elongated shape. Specifically, the airbag 25 is folded so as to form an elongated folding completion body 105 substantially along the left-right direction. Although not illustrated in detail, the folding completion body 105 is formed by folding the bag body 26 in a substantially flat unfolded state so as to reduce the front-rear direction width dimension by overlapping the front wall 27 with the rear wall 28 and the lower wall 29. The folding completion body 105 formed by folding the bag body 26 in this manner is disposed so as to be overlapped on the upper surface side when the lap belt 10 is worn together with the body-side part 36 of the conduit 35 by inserting the lap belt 10 through the belt loop 40. The folding completion body 105 is disposed in the region of the lap belt 10 in a state of being covered with a main cover 101 to be described later in the cover 100 together with the belt loop 40 and the lap belt 10 (see FIG. 16). In the case of the embodiment, in the non-wearing state as illustrated in FIG. 1, the folding completion body 105 is disposed on the left side of the lap belt 10 in a twisted state so as to twist the lap belt 10.

Figure 8:
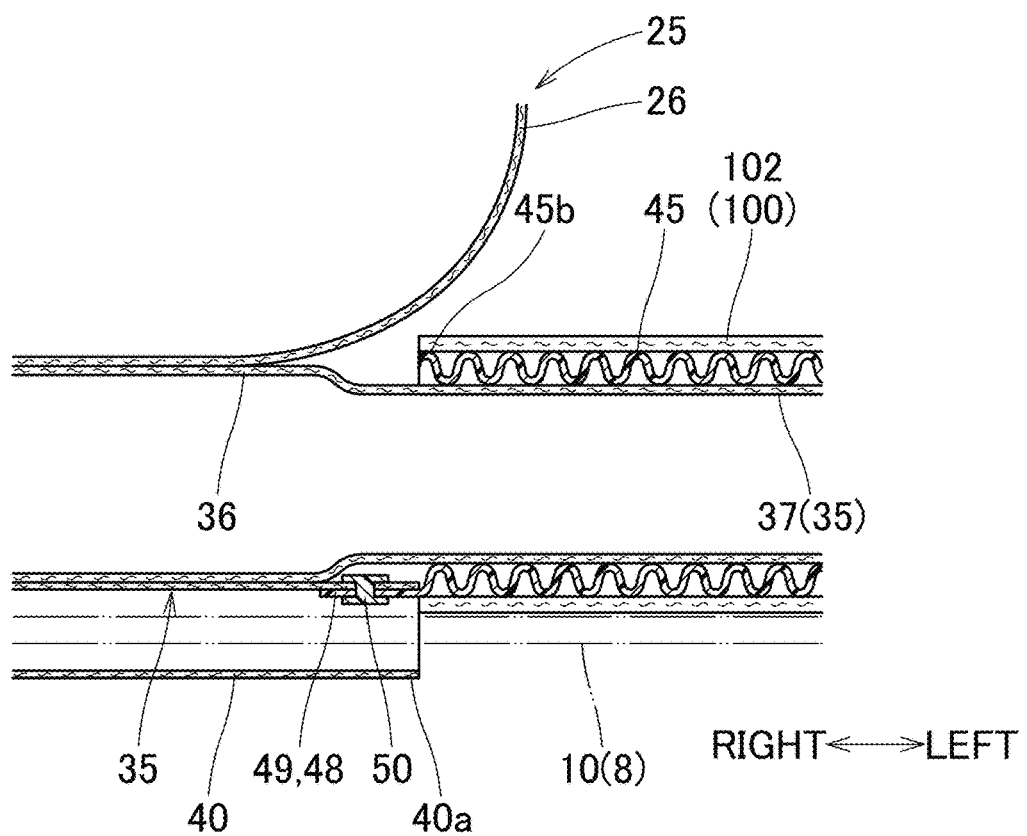
FIG. 8 is a schematic partially enlarged sectional view illustrating a state where a bag body-side fixing portion of the conduit holder and the airbag are fixed to each other in the occupant protection device according to the embodiment.
Figure 9:
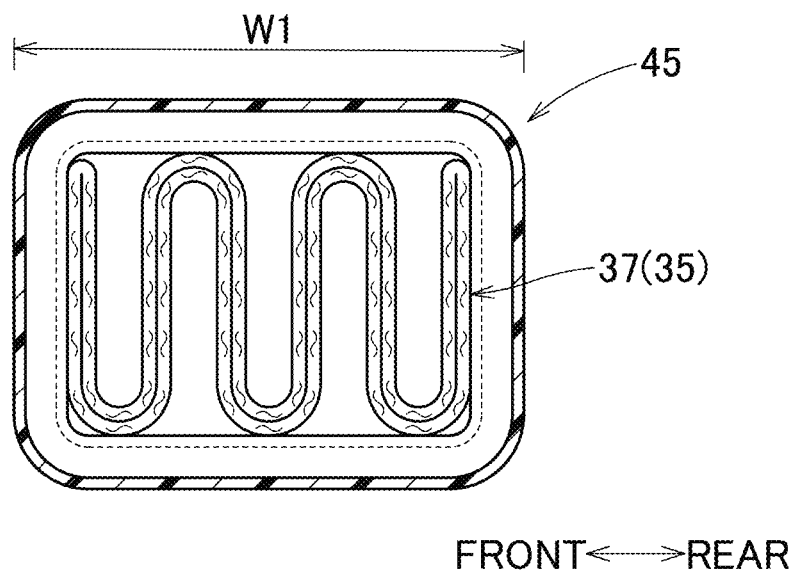
FIG. 9 is a schematic transverse sectional view of the conduit holder in the occupant protection device according to the embodiment.
Figure 10:
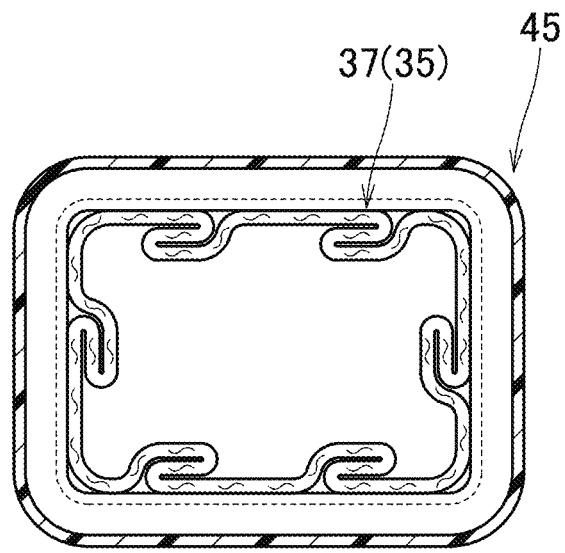
FIG. 10 is a schematic transverse sectional view illustrating the part of the conduit holder when the airbag completes inflation in the occupant protection device according to the embodiment.
Figure 14:
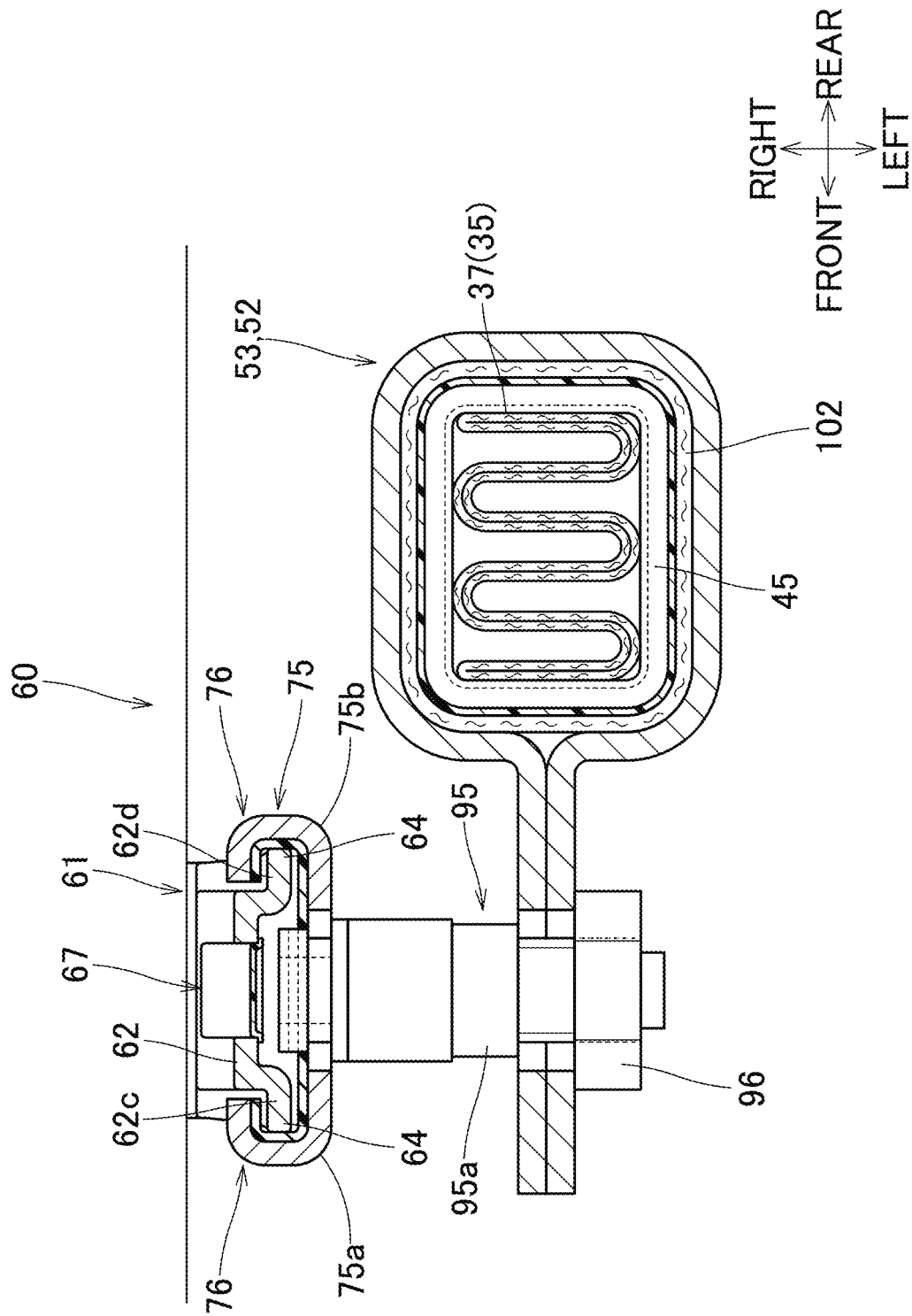
FIG. 14 is a schematic transverse sectional view of the part of a seat-side fixing portion in the occupant protection device according to the embodiment.

The conduit holder 45 holding the conduit 35 is formed of a material with flexibility and higher rigidity than the conduit 35. In the case of the embodiment, the conduit holder 45 is made of synthetic resin, and is formed of a bellows tube that can cover the outer peripheral side of the conduit 35. Specifically, the conduit holder 45 has appropriate self-standing ability (non-flexibility) when handled alone. In addition, since the conduit holder 45 has a bellows tubular shape, it is easy to be curved. Specifically, examples of the material for forming the conduit holder 45 include polypropylene (PP), polyethylene (PE), and various thermoplastic elastomers (TPE) such as olefin-based and urethane-based thermoplastic elastomers. Specifically, the conduit holder 45 is disposed so as to cover the outer peripheral side of the region of the connection-side part 37 in the conduit 35 over substantially the entire length (see FIGS. 3, 4, 8, and 9). The conduit holder 45 is formed of a bellows tube with a substantially rectangular cross-section, and in the case of the embodiment, is disposed in a manner that the long side is substantially along the front-rear direction (see FIGS. 1 and 14). More specifically, in the case of the embodiment, the cross-sectional area of the conduit holder 45 is set to be smaller than the cross-sectional area of the connection-side part 37 in a state where the inflation of the connection-side part alone is completed. Specifically, in the conduit holder 45, a width dimension W1 on the long side is set to be smaller than a width dimension W2 of the connection-side part 37 in a flat unfolded state (see FIGS. 6 and 9). As illustrated in FIGS. 9 and 14, the connection-side part 37 is inserted into the conduit holder 45 in a folded state so as to reduce the width dimension. In the embodiment, the connection-side part 37 of the conduit 35 is inflated and disposed so as to fill the inside of the conduit holder 45 when the inflation of the airbag 25 is completed (see FIG. 10). The cross-sectional area of the conduit holder 45 is set to a size that does not hinder quick inflation of the airbag 25 (the bag body 26) when the inflator 17 is activated (a size that allows the inflation gas to smoothly flow through the connection-side part 37). Both end sides of the conduit holder 45 are fixed to the seat 1 side and the bag body 26 side, respectively by a seat-side fixing portion 52 or a bag body-side fixing portion 48 (see FIG. 3).

Figure 7:
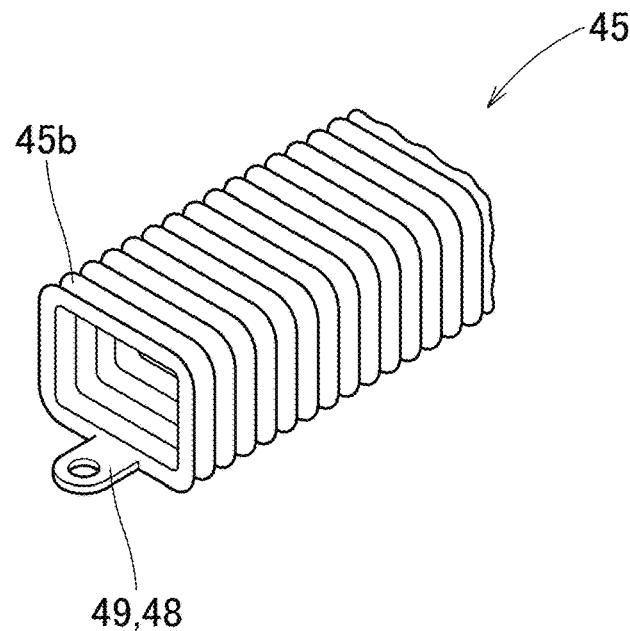
FIG. 7 is a schematic perspective diagram illustrating one end side of a conduit holder used in the occupant protection device according to the embodiment.

In the case of the embodiment, the bag body-side fixing portion 48 is coupled to the belt loop 40 of the airbag 25. Specifically, the bag body-side fixing portion 48 has an attachment piece 49 protruding rightward from a right end 45b of the conduit holder 45 (see FIG. 7), and as illustrated in FIG. 8, the attachment piece 49 is overlapped with the region on the left edge 40a side of the belt loop 40 and coupled thereto using a fixing unit 50 such as a rivet, thereby being coupled to the belt loop 40 and fixed to the bag body 26 side.

In the case of the embodiment, as illustrated in FIG. 3, the seat-side fixing portion 52 of the conduit holder 45 is disposed at a position closer to the center than an end 45a on the other side (the left side) of the conduit holder 45. The seat-side fixing portion 52 is fixed to the seat 1 side via the position adjuster 60 provided on the seat 1 side. Specifically, the seat-side fixing portion 52 includes a bracket 53 disposed so as to wrap around the entire periphery of the conduit holder 45 from the outer peripheral side of a conduit-side cover 102 to be described later in the cover 100. The seat-side fixing portion 52 is fixed at a position on the side of the seat portion 3 of the seat 1 by coupling the bracket 53 to a movable side portion 75 to be described later in the position adjuster 60 (see FIG. 14). In the case of the embodiment, the left end 45a of the conduit holder 45 is coupled to the connecting pipe 19 of the inflator 17 using a clamp 46 at a position behind the clamp 20 for coupling the distal end 37*a* of the connection-side part 37 (see FIG. 4). The left end 45*a* of the conduit holder 45 is disposed to be curved (see FIG. 3).

As illustrated in FIGS. 1 to 3, the position adjuster 60 is disposed on the side (to the left in the case of the embodiment) of the seat portion 3 in the seat 1. Specifically, the position adjuster 60 is disposed slightly behind the center of the seat portion 3 in the front-rear direction and adjacent to the front side of the conduit 35 and the conduit holder 45. As illustrated in FIGS. 11A to 13B, the position adjuster 60 includes a slide rail 61 fixed to the seat 1 side and a movable side portion 75 slidably attached to the slide rail 61. As described above, the bracket 53 constituting the seat-side fixing portion 52 of the conduit holder 45 is coupled to the movable side portion 75 (see FIG. 14).

The slide rail 61 has an elongated shape disposed substantially along the vertical direction. In the case of the embodiment, the slide rail 61 is disposed along the left side surface of the seat portion 3 in a manner that the width direction side is substantially along the front-rear direction, and is disposed to be slightly inclined with respect to the vertical direction in a manner that the upper end side is located front. As illustrated in FIGS. 11A to 13B, the slide rail 61 includes an elongated body 62, and an upper attachment portion 71 and a lower attachment portion 72 that are respectively arranged on an upper end 62*a* side and a lower end 62*b* side of the body 62 and attached to the seat 1 side. Although not illustrated in detail, the upper attachment portion 71 is configured to be attached to a predetermined bracket or the like disposed in the seat portion 3. The lower attachment portion 72 is configured to be attached to the seat frame 4.

Figure 15A:
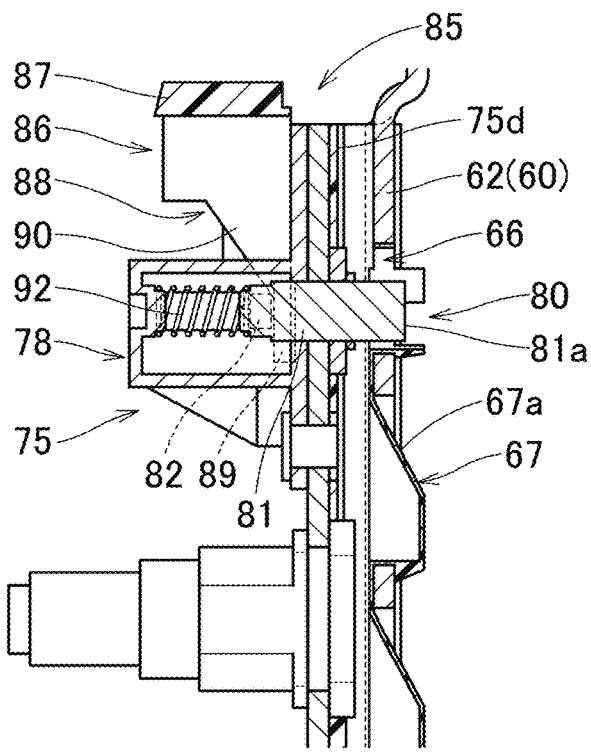
FIGS. 15A, 15B, and 15C are schematic sectional views for explaining a state where a movable side portion is slid with respect to a slide rail.
Figure 15B:
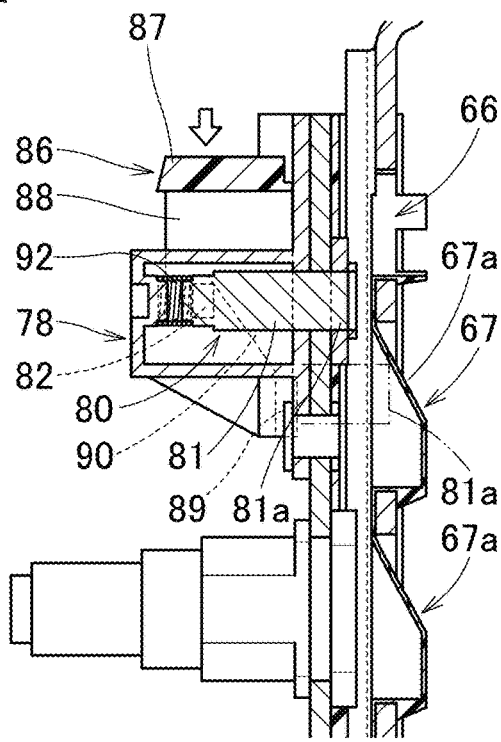
Figure 15C:
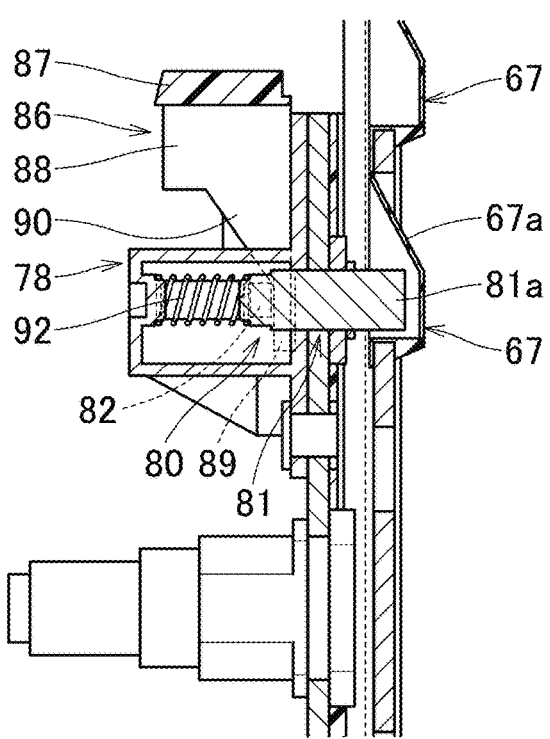

The body 62 includes rail bodies 64 disposed in the region on a front edge 62*c* side and the region on a rear edge 62*d* side, a locking hole 66 through which a pin body 81 to be described later of a locking pin portion 80 formed in the movable side portion 75 can be inserted, and a locking recess 67 into which the pin body 81 can be inserted. The rail bodies 64 allow the movable side portion 75 to be slidable substantially along the longitudinal direction of the body 62. In the case of the embodiment, the rail bodies 64 are formed to be bent on the front edge 62*c* side and the rear edge 62*d* side of the body 62 so as to be substantially parallel to the body 62 while floating from the central region of the body 62 (see FIG. 14). Each rail body 64 is continuously formed over substantially the entire of the body 62 in up-down direction. The locking hole 66 is formed on the upper end side of the central region of the body 62 (the region between the rail bodies 64 and 64) so as to penetrate the body 62 (see FIG. 11B and FIGS. 13A and 13B). The locking hole 66 has a substantially oval opening shape in which the distal end 81*a* side of the pin body 81 of the locking pin portion 80 can be inserted and whose portion on the longitudinal direction side (the vertical direction side) of the rail bodies 64 is slightly wide (see FIG. 11B). The locking recess 67 is disposed below the locking hole 66 in the central region of the body 62, and as illustrated in FIG. 13B, allows the pin body 81 of the locking pin portion 80 in the movable side portion 75 that slides with respect to the slide rail 61 (the body 62) to be inserted and locked. In the case of the embodiment, as illustrated in FIGS. 13A and 13B, three locking recesses 67 are arranged side by side substantially along the longitudinal direction of the rail bodies 64. Each of the locking recesses 67 has a bottomed shape in the case of the embodiment. The outer shape of each of the locking recesses 67 when viewed from the left is configured as a substantially oval shape in which the distal end 81*a* side of the pin body 81 can be inserted and the width dimension in the vertical direction is set larger than that of the locking hole 66 (see FIG. 11B). Specifically, the locking recess 67 is configured to lock the distal end 81*a* side of the pin body 81 with a lower region. On the bottom surface side of the upper region in the locking recess 67, a guide wall 67*a* capable of guiding the distal end 81*a* of the pin body 81 during sliding movement to the lower region is formed to be inclined (see FIGS. 15A to 15C). Furthermore, in the vicinity of the lower end 62*b* of the body 62, a stopper piece 69 that restricts the downward movement of the movable side portion 75 is formed so as to be cut and raised to the front surface side (to a left side surface 75*c* side (see FIGS. 13A and 13B).

The movable side portion 75 is disposed to the left side of the slide rail 61. The movable side portion 75 includes: sliding portions 76 that are slidable with respect to the rail bodies 64 formed in the slide rail 61; the locking pin portion 80 that can be locked by being inserted into the locking hole 66 or the locking recess 67; an operating portion 85 that can retract the locking pin portion 80 at the time of a pressing operation; a holder 78 that holds the locking pin portion 80 and the operating portion 85; and an attachment portion 95 for attaching the bracket 53 constituting the seat-side fixing portion 52 of the conduit holder 45 (see FIGS. 11A to 13B). The sliding portions 76 and 76 are formed, on the front edge 75*a* side and the rear edge 75*b* side of the movable side portion 75, so as to wrap around the outer peripheral side of the rail bodies 64 in substantially three directions (see FIG. 14). As illustrated in FIGS. 12A and 12B, the sliding portions 76 and 76 are continuously formed over substantially the entire upper and lower regions of the movable side portion 75.

The holder 78 is formed to protrude in a substantially box shape from the left side surface 75*c* of the movable side portion 75 between the sliding portions 76 and 76. The holder 78 is configured to be capable of housing and holding the locking pin portion 80, and to hold an operating body 86 to be described later of the operating portion 85 so as to be slidable in the vertical direction. In the case of the embodiment, the holder 78 is disposed in the region of about the upper half of the movable side portion.

The locking pin portion 80 includes the pin body 81 having a substantially columnar outer shape. The locking pin portion 80 is held by the holder 78 in a manner that the distal end 81*a* side of the pin body 81 protrudes from a right side surface 75*d* of the movable side portion 75 to the slide rail 61 (rightward) in a non-operating state of the operating portion 85 (see FIGS. 13A, 13B, and 15A to 15C). In addition, the locking pin portion 80 has a pressed portion 82 that is pressed by a pressing piece 88 to be described later of the operating portion 85 when the operating portion 85 is operated (see FIGS. 15A to 15C). Although not illustrated in detail, the pressed portion 82 is formed to protrude to both front and rear sides so as to be substantially orthogonal to the pin body 81 in the region on the original portion 81*b* side (the left end side) of the pin body 81. The pressed portion 82 is configured to be pressed leftward by the pressing piece 88 of the operating body 86 at the time of the pressing operation of the operating body 86 to be described later in the operating portion 85. At the time of the pressing operation of the operating body 86, the locking pin portion 80 receives the pressing force acting on the pressed portion 82, and slides leftward in the holder 78 so as to retract the distal end 81*a* side of the pin body 81 (see FIG. 15B).

The operating portion 85 includes the operating body 86 for the pressing operation, and a compression coil spring 92 as a biasing unit disposed in the holder 78. The operating body 86 includes a pressing plate 87 disposed on the upper end side and the pressing piece 88 extending downward from the pressing plate 87 to move the pressed portion 82, and is held by the holder 78 so as to be slidable vertically. The pressing plate 87 is operated at the time of pressing, and in the case of the embodiment, is disposed at a position above the holder 78 in the non-operating state. In addition, the outer shape of the pressing plate 87 is a substantially rectangular plate shape so that the pressing plate is disposed to be substantially orthogonal to the pressing direction (see FIG. 11A to 13B). As illustrated in FIG. 11A, the pressing piece 88 is formed to extend downward from each of both front and rear end sides of the pressing plate 87. On the lower end side of each pressing piece 88, a distal end piece 89 disposed adjacent to the right side of the pressed portion 82 of the locking pin portion 80 (the distal end 81a side of the pin body 81) as a narrow width, and a guide piece 90 formed to be inclined so as to be expanded from the upper end side of the distal end piece 89 (the upper side of the pressed portion 82 when not operated) are disposed (see FIG. 13A and FIGS. 15A to 15C). The guide piece 90 guides the pressed portion 82 to move leftward against the biasing force of the compression coil spring 92 when the pressing plate 87 is pressed. As illustrated in FIGS. 13A and 13B, the compression coil spring 92 is disposed in the holder 78 to urge the locking pin portion 80 from leftward to rightward (toward the slide rail 61).

The attachment portion 95 is disposed in the region below the holder 78, and in the case of the embodiment, includes an attachment bolt 95a protruding leftward (see FIGS. 12A to 13B). In the embodiment, as illustrated in FIG. 14, the bracket 53 constituting the seat-side fixing portion 52 is configured to be attached to the movable side portion 75 using the attachment bolt 95a and a nut 96.

The movable side portion 75 can be slid with respect to the slide rail 61 as follows. When the occupant MP (the wearer) wearing the seat belt 7 and seated on the seat 1 presses the pressing plate 87 of the operating body 86 with the finger or the like while holding the movable side portion 75, the locking pin portion 80 can be moved leftward, and with this movement, the pin body 81 of the locking pin portion 80 can be retracted in the holder 78. Since the locking state of the pin body 81 with the locking hole 66 or the locking recess 67 is released, the movable side portion 75 can be slid up and down with respect to the slide rail 61 in a state of maintaining the pressed state of the pressing plate 87 (see FIG. 15B). When the finger or the like is released from the pressing plate 87 after the sliding movement, the operating body 86 returns to the position before the operation by the restoration of the compression coil spring 92, and the pin body 81 of the locking pin portion 80 is also disposed to protrude from the movable side portion 75. As a result, the distal end 81a side of the pin body 81 is inserted into the locking hole 66 or the locking recess 67 and locked to the peripheral edge (see FIG. 15C). In the occupant protection device S according to the embodiment, by sliding the movable side portion 75 with respect to the slide rail 61, the position of the seat-side fixing portion 52 (the bracket 53) of the conduit holder 45 can be moved up and down with respect to the seat portion 3. That is, by sliding the movable side portion 75 with respect to the slide rail 61, the substantial length of the conduit holder 45 (the distance from the bag body-side fixing portion 48 to the position corresponding to the left edge side of an upper surface 3b of the seat portion 3 in the conduit holder 45) can be changed. In the embodiment, since the total number of the locking hole 66 and the locking recesses 67 arranged is four, the position of the movable side portion 75 can be changed in four stages. That is, in the occupant protection device S according to the embodiment, the substantial length of the conduit holder 45 can be changed in four stages.

In the case of the embodiment, as illustrated in FIGS. 1 to 3, the cover 100 covering the periphery of the airbag 25 includes the main cover 101 disposed to cover the folding completion body 105 and the conduit-side cover 102 disposed to cover the conduit 35. The cover 100 is formed of a flexible sheet, and specifically formed of a sheet such as synthetic leather or fabric.

Specifically, the main cover 101 is configured to cover the outer peripheral side of the folding completion body 105 and the body-side part 36 of the conduit 35 together with the belt loop 40 and a part of the lap belt 10 over substantially the entire region. The main cover 101 is configured in a manner that the bag body 26 can protrude by breaking a predetermined portion substantially entirely from left to right when the airbag 25 is inflated. The conduit-side cover 102 is disposed to be continuous from the main cover 101, and is configured to cover the outer peripheral side of the conduit holder 45 (see FIGS. 8 and 14). In the case of the embodiment, as illustrated in FIGS. 1 to 3, the conduit-side cover 102 is configured to cover up to the vicinity of the arrangement region of the bracket 53 (the seat-side fixing portion 52) in the conduit holder 45.

Figure 18:
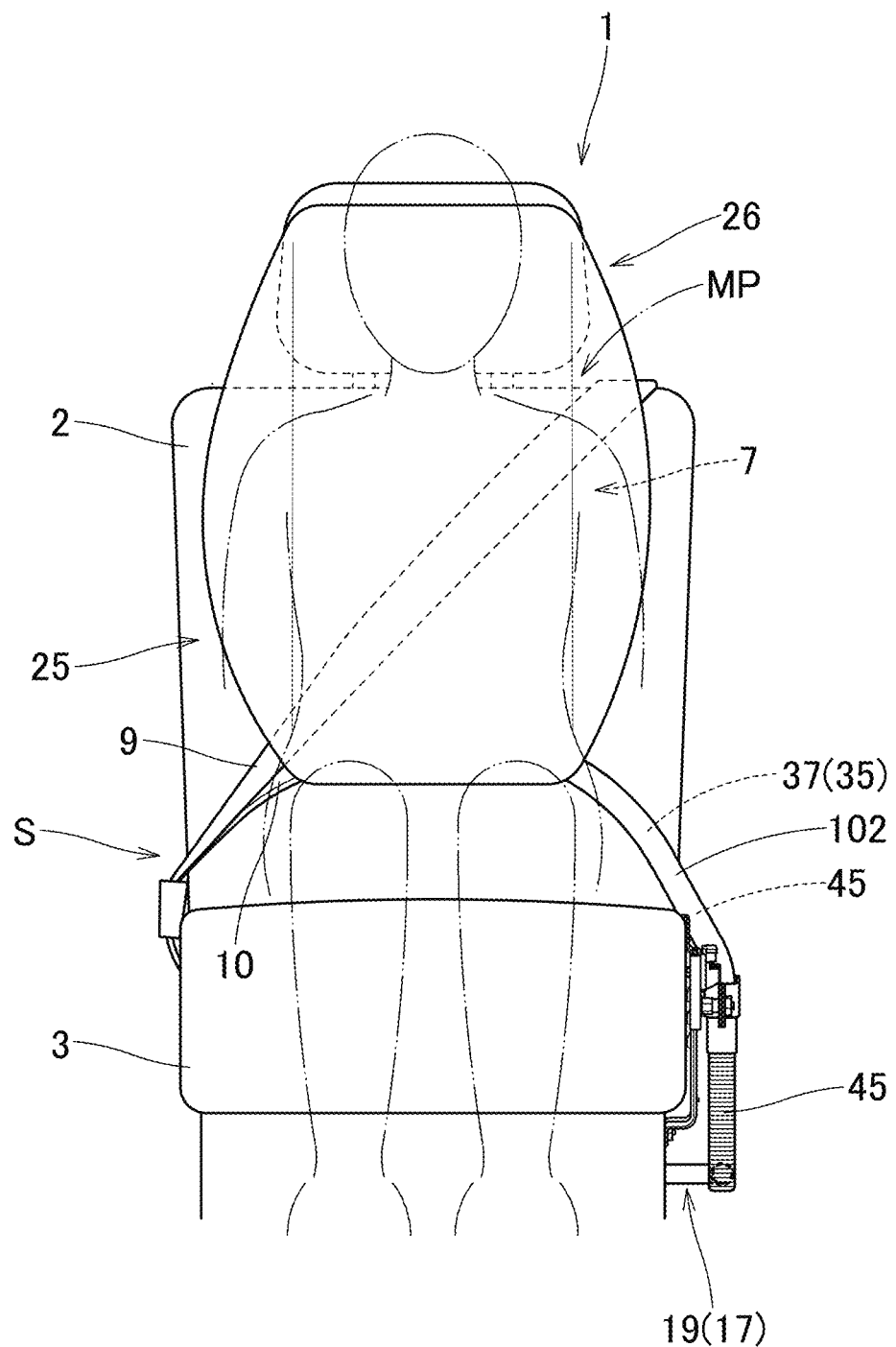
FIG. 18 is a front view of the seat in a state where the airbag completes inflation in the occupant protection device according to the embodiment.
Figure 19:
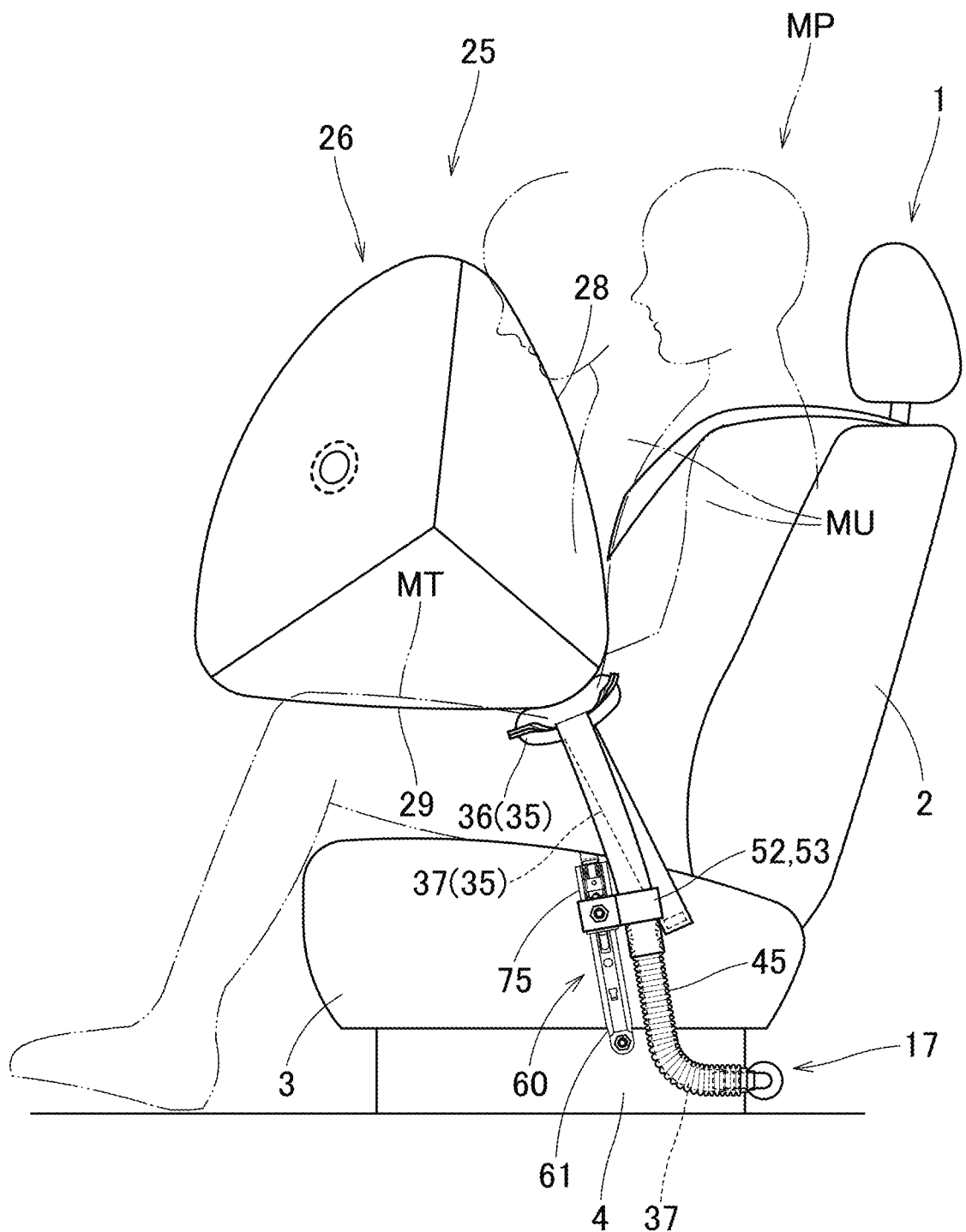
FIG. 19 is a side view of the seat in a state where the airbag completes inflation in the occupant protection device according to the embodiment.

In the occupant protection device S according to the embodiment, when the inflator 17 is operated in a state where the occupant MP wearing the seat belt 7 is seated on the seat 1 mounted on the vehicle, the inflation gas discharged from the inflator 17 flows into the bag body 26 via the conduit 35. While the bag body 26 of the airbag 25 protrudes forward and upward from the lap belt 10 so as to break the main cover 101, the inflation is completed as illustrated in FIGS. 18 and 19. Furthermore, when the inflation of the airbag 25 is completed, in the occupant protection device S according to the embodiment, the connection-side part 37 of the conduit 35 inflates to fill the inside of the conduit holder 45 (see FIG. 10).

In the occupant protection device S according to the embodiment, in the airbag 25, the conduit 35 extending from the folded bag body 26 (the folding completion body 105) and connected to the inflator 17 is configured to be held by the conduit holder 45. The conduit holder 45 is configured to be disposed substantially along the conduit 35 (specifically, the connection-side part 37 of the conduit 35) and have both end sides fixed to the seat 1 side and the bag body 26 side, respectively, and is formed of a material with higher rigidity than the conduit 35. Therefore, the conduit holder 45 can appropriately prevent the region of the conduit 35 from being disposed in a twisted manner together with the lap belt 10 in the non-wearing state (the state where the occupant is not seated) such as the vehicle mounted state. As a result, at the time of wearing, it is not necessary to correct the twisted state of the region of the conduit 35 (the connection-side part 37) by the hand or the like of the wearer (the occupant MP), and simply by the occupant wearing the seat belt 7, the folding completion body 105 (the bag body 26) can be easily disposed at an appropriate position for the occupant MP.

Therefore, the occupant protection device S according to the embodiment can prevent the occurrence of twisting or the like, and can be easily worn.

Further, in the occupant protection device S according to the embodiment, since the conduit 35 is held by the conduit holder 45, when the inflation gas discharged from the inflator 17 flows into the bag body 26 through the conduit 35 during the operation of the inflator 17, it is also possible to prevent the region of the conduit 35 (the connection-side part 37) from fluttering caused by the inflow of the inflation gas. Therefore, the arrangement position of the inflating bag body 26 can be quickly stabilized, and the occupant MP can be quickly and stably protected by the inflated airbag 25 (the inflated bag body 26). Furthermore, since the conduit holder 45 has flexibility, the conduit holder 45 can be easily bent substantially along the lower body MD of the wearer (the occupant MP) together with the lap belt 10 and the conduit 35, and the occupant has a good feeling of wearing.

In the occupant protection device S according to the embodiment, the folding completion body 105 formed by folding the bag body 26 is configured to be held by the lap belt 10 so as to be displaceable with respect to the lap belt 10. Therefore, at the time of wearing, the bag body 26 (the folding completion body 105) can be disposed at an appropriate position for the occupant MP. In the occupant protection device S according to the embodiment, the lap belt 10 is disposed substantially along the vertical direction in the vehicle mounted state (the state where the occupant does not wear the seat belt). However, since the conduit 35 is held by the conduit holder 45, even when the folding completion body 105 is configured to be displaceable with respect to the lap belt 10, the conduit holder 45 can reliably prevent the region of the conduit 35 from slackening from the lap belt 10. It is also possible to prevent the bag body 26 from sliding down from the lap belt 10 caused by such slackening. If such a point is not taken into consideration, the bag body (the folding completion body) may be configured to be fixed to the lap belt so as not to be displaceable.

Furthermore, in the occupant protection device S according to the embodiment, the conduit holder 45 is formed of a substantial tube capable of covering the outer peripheral side of the conduit 35 (the connection-side part 37), and more specifically, is formed of a bellows tube made of synthetic resin. Therefore, when the airbag 25 is inflated, the conduit 35 (the connection-side part 37) is inflated in the conduit holder 45, and it is possible to prevent the inflated conduit 35 (the connection-side part 37) from directly and strongly pressing the arms and the like of the occupant. In particular, in the occupant protection device S according to the embodiment, the cross-sectional area of the conduit holder 45 is set to be smaller than the cross-sectional area in a state where the inflation of the connection-side part 37 alone of the conduit 35 is completed, and the connection-side part 37 is configured to be inserted into the conduit holder 45 in a folded state. As a result, the region of the conduit 35 (specifically, the region of the connection-side part 37) is not bulky and can be compactly mounted on the vehicle. In the occupant protection device S according to the embodiment, when the inflation of the airbag 25 is completed, the connection-side part 37 of the conduit 35 is configured to inflate to fill the inside of the conduit holder 45. That is, the region of the connection-side part 37 has an aspect in which the outer peripheral side is covered with the conduit holder 45 to form a double tube, and the conduit holder 45 reinforces the connection-side part 37. Therefore, it is also possible to relatively reduce the outer diameter dimension (the cross-sectional area at the time of inflation) of the conduit (the connection-side part), and it is also possible to contribute to the cost reduction by reducing the amount of base material used.

Figure 21:
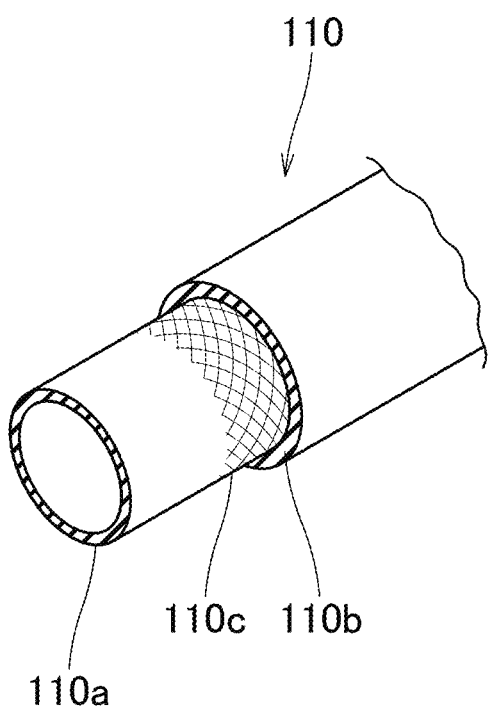
FIG. 21 is a schematic perspective diagram of a conduit holder of another embodiment.

In a case where a tube is used as the conduit holder, the tube does not need to be a bellows tube as in the embodiment, and for example, the conduit holder may be formed of a tube with a configuration in which a mesh reinforcing layer is disposed over the entire circumference of a rubber-like elastic body as a base material. Specifically, it is possible to exemplify a conduit holder 110 having a configuration in which a reinforcing layer 110c made of a synthetic resin mesh is interposed between base material layers 110a and 110b made of synthetic rubber, natural rubber, or the like, as illustrated in FIG. 21.

The conduit holder does not need to be a tube unless the above point is taken into consideration. Although detailed illustration is omitted, as long as the conduit holder is made of a material with flexibility and higher rigidity than the conduit, the conduit holder may be formed of, for example, a plate-like body made of a flexible synthetic resin, a rod-like member made of synthetic resin or metal and configured to be bendable only in a certain direction (a rod-like member formed by coupling a large number of links).

As in the embodiment, in a case where the conduit holder 45 is formed of a substantial tube capable of covering the outer peripheral side of the conduit 35 (the connection-side part 37), if it is configured to fix at least one end side of the conduit holder 45 to the seat side or the bag body side, the arrangement position of the conduit holder 45 with respect to the conduit 35 can be stabilized to some extent. Therefore, in a case where a tubular conduit holder is used and disposed to cover the outer peripheral side of the conduit, even if it is configured to fix at least one end side to the seat side or the bag body side unlike the embodiment, the conduit holder can reliably prevent the region of the conduit from being twisted together with the lap belt.

Figure 20:
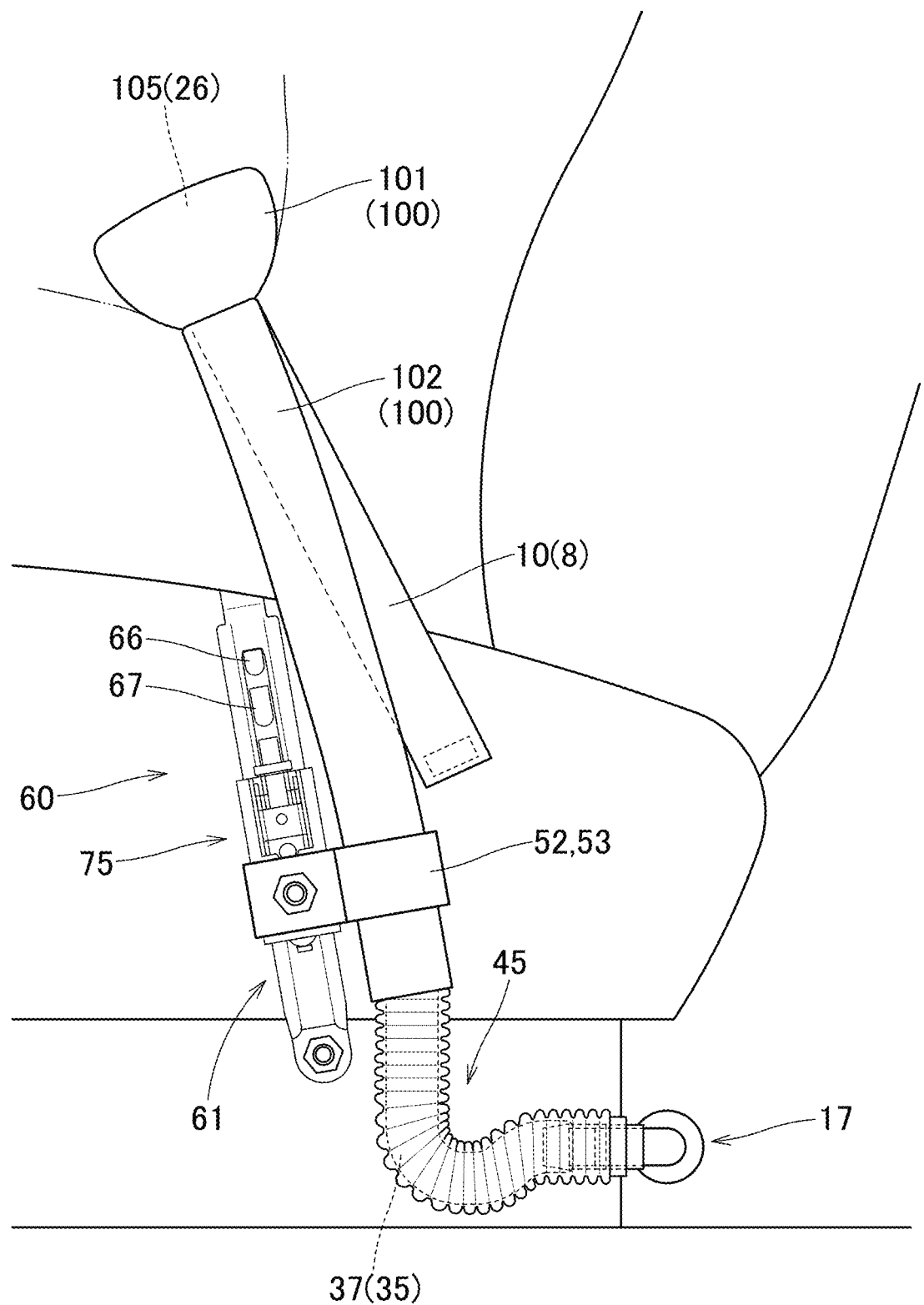
FIG. 20 is a partially enlarged side view of the seat illustrating a state where the movable side portion is slid downward in the occupant protection device according to the embodiment.

In addition, the occupant protection device S according to the embodiment is configured that the seat-side fixing portion 52 is attached to a position on the side of the seat portion 3 via the position adjuster 60, and the seat-side fixing portion 52 is slidable along the length direction of the conduit holder 45 with respect to the seat portion 3 by the position adjuster 60. That is, in the occupant protection device S according to the embodiment, the seat-side fixing portion 52 of the conduit holder 45, that is, the attachment position of the conduit holder 45 to the seat 1 side (the side of the seat portion 3) can be slid by the position adjuster 60. The position adjuster 60 can thus increase or reduce the substantial length dimension of the conduit holder 45 (the distance from the bag body-side fixing portion 48 to the position corresponding to the left edge side of the upper surface 3b of the seat portion 3 in the conduit holder 45) when the seat belt 7 is worn, and can adjust the position of the folding completion body 105 depending on the physique of the occupant. More specifically, as illustrated in FIG. 20, when the movable side portion 75 is positioned on the lower end side of the slide rail 61 and the position of the seat-side fixing portion 52 is shifted relatively downward, the substantial length dimension of the conduit holder 45 can be reduced as compared with the case where the movable side portion 75 is positioned on the upper end side of the slide rail 61 (see FIGS. 2, 3, and 17). By reducing the substantial length dimension of the conduit holder 45, even in a case where a small occupant such as a woman wears a seat belt, the folding completion body can be disposed in a manner that the center in the length direction substantially matches the center of the occupant in the left-right direction. In addition, in a case where the seat-side fixing portion 52 is disposed at a position shifted downward as described above, the seat-side fixing portion 52 is disposed closer to the floor surface or the like of the vehicle by a movement distance. However, in the occupant protection device S according to the embodiment, the conduit holder 45 is formed of a bellows tube. Therefore, the part of the conduit holder 45 closer to the end than the seat-side fixing portion 52 (the region of the conduit holder 45 exposed from the conduit-side cover 102) can be easily curved (see FIG. 20). As a result, even if an excess part is generated in the region on the lower end side of the conduit holder 45 due to the downward movement of the seat-side fixing portion 52, such a part can be disposed relatively compactly without largely protruding to the floor surface. If such a point is not taken into consideration, the seat-side fixing portion of the conduit holder may be directly attached to the seat side without disposing the position adjuster.

Furthermore, the occupant protection device S according to the embodiment is configured that the bag body-side fixing portion 48 is attached to the belt loop 40 in the airbag 25 through which the lap belt 10 can be inserted. As a result, the conduit holder 45 does not need to be directly attached to the bag body 26 and can be easily attached, and the airtightness of the bag body 26 can also be ensured. It is needless to mention that, if such a point is not taken into consideration, the bag body-side fixing portion does not need to be attached to the belt loop.

The occupant protection device S according to the embodiment is configured that the seat belt 7 and the inflator 17 are mounted on the seat 1. Therefore, even in a case where the seat 1 is moved with respect to the vehicle, for example, largely slid or rotated back and forth, the occupant MP seated on the seat 1 can be accurately protected by the airbag 25. It is needless to mention that the occupant protection device according to the present disclosure can be mounted on not only the seat with such a configuration but also a seat in which the occupant is restrained by a seat belt including a retractor provided on the vehicle body side. The inflator may be configured to be attached to the vehicle body side.

The present disclosure relates to an occupant protection device with the following configuration.

An occupant protection device disposed on a seat of a vehicle, including:
  a seat belt;
  an airbag disposed in a region of a lap belt that restrains a waist of an occupant seated on the seat when the occupant wears the seat belt; and
  an inflator disposed at a position near a lower end of a seat portion of the seat and supplies an inflation gas to the airbag,
  the airbag having a bag shape formed of a flexible sheet, and including
  a bag body that is held by the lap belt in a folded state and inflates to be able to protect the occupant wearing the seat belt, and
  a conduit that is connected to the inflator to allow the inflation gas to flow into the bag body,
  wherein
  the conduit is disposed substantially along the lap belt in a state of being held by a conduit holder, and
  the conduit holder is formed of a material having flexibility and higher rigidity than the conduit, is disposed substantially along the conduit, and has both end sides fixed to a seat side and a bag body side, respectively by a seat-side fixing portion or a bag body-side fixing portion.

In the occupant protection device according to the present disclosure, in the airbag, the conduit extending from the folded bag body and connected to the inflator is configured to be held by the conduit holder. The conduit holder is configured to be disposed substantially along the conduit and have both end sides fixed to the seat side and the bag body side, respectively, and is formed of a material with higher rigidity than the conduit. Therefore, the conduit holder can appropriately prevent the region of the conduit from being disposed in a twisted manner together with the lap belt in the non-wearing state (the state where the occupant is not seated) such as the vehicle mounted state. As a result, at the time of wearing, it is not necessary to correct the twisted state of the region of the conduit by the hand or the like of the wearer (the occupant), and simply by the occupant wearing the seat belt, the folding completion body can be easily disposed at an appropriate position for the occupant.

Therefore, the occupant protection device according to the present disclosure can prevent the occurrence of twisting or the like, and can be easily worn.

Further, in the occupant protection device according to the present disclosure, since the conduit is held by the conduit holder, when the inflation gas discharged from the inflator flows into the bag body through the conduit during the operation of the inflator, it is also possible to prevent the region of the conduit from fluttering caused by the inflow of the inflation gas. Therefore, the arrangement position of the inflating bag body can be quickly stabilized, and the occupant can be quickly and stably protected by the inflated airbag (the inflated bag body). Furthermore, since the conduit holder has flexibility, the conduit holder can be easily bent substantially along the lower body of the wearer together with the lap belt and the conduit, and the occupant has a good feeling of wearing.

In the occupant protection device according to the present disclosure, the folding completion body formed by folding the bag body is preferably held by the lap belt so as to be displaceable with respect to the lap belt.

With such a configuration of the occupant protection device, at the time of wearing, the bag body (the folding completion body) can be disposed at an appropriate position for the occupant. Further, in the occupant protection device with the above configuration, the lap belt is disposed substantially along the vertical direction in the vehicle mounted state (the state where the occupant does not wear the seat belt). Since the conduit is held by the conduit holder, even when the folding completion body is configured to be displaceable with respect to the lap belt, the conduit holder can reliably prevent the region of the conduit from slackening from the lap belt. It is also possible to prevent the bag body from sliding down from the lap belt caused by such slackening.

In the occupant protection device according to the present disclosure, when the conduit holder is formed of a substantial tube that is able to cover an outer peripheral side of the conduit, at the time of the inflation of the airbag, the conduit is inflated in the conduit holder and thus it is possible to prevent the inflating conduit from directly and strongly pressing the arms and the like of the occupant, which is preferable.

Specifically, examples of the substantially tubular conduit holder used in the occupant protection device with the above configuration include a bellows tube made of synthetic resin and a tube with a configuration in which a mesh reinforcing layer is disposed over an entire circumference of a rubber-like elastic body as a base material.

In the occupant protection device with the above configuration, the seat-side fixing portion is preferably configured to be attached to a position on a side of the seat portion via a position adjuster, and the position adjuster is preferably configured to be able to slide the seat-side fixing portion along a length direction of the conduit holder with respect to the seat portion.

With such a configuration of the occupant protection device, the seat-side fixing portion of the conduit holder, that is, the attachment position of the conduit holder to the seat side (the side of the seat portion) can be slid by the position adjuster. The position adjuster can thus increase or reduce the substantial length dimension of the conduit holder (the distance from the bag body-side fixing portion to the position corresponding to the upper surface of the seat portion in the conduit holder) when the seat belt is worn. As a result, the position of the folding completion body can be adjusted depending on the physique of the occupant.

In the occupant protection device according to the present disclosure, the airbag preferably includes a belt loop through which the lap belt can be inserted, and the bag body-side fixing portion is preferably attached to the belt loop.

With such a configuration of the occupant protection device, the conduit holder does not need to be directly attached to the bag body and can be easily attached, and the airtightness of the bag body can also be ensured.

What is claimed is:

1. An occupant protection device disposed on a seat of a vehicle, including:
    a seat belt;
    an airbag disposed in a region of a lap belt that restrains a waist of an occupant seated on the seat when the occupant wears the seat belt;
    an inflator disposed at a position near a lower end of a seat portion of the seat and supplies an inflation gas to the airbag; and
    a cover adapted to cover a periphery of the airbag,
    the airbag having a bag shape formed of a flexible sheet, and including
    a bag body that is held by the lap belt in a folded state and inflates to be able to protect the occupant wearing the seat belt, and
    a conduit that is connected to the inflator to allow the inflation gas to flow into the bag body,
    wherein
    the conduit is disposed substantially along the lap belt in a state of being held by a conduit holder,
    the conduit holder is formed of a material having flexibility and higher rigidity than the conduit, is disposed substantially along the conduit, and has both end sides fixed to a seat side and a bag body side, respectively by a seat-side fixing portion or a bag body-side fixing portion,
    the cover includes a main cover and a conduit-side cover, the main cover is configured to cover an outer peripheral side of the folded bag body and a part of the lap belt, and the conduit-side cover is configured to cover an outer peripheral side of the conduit holder.

2. The occupant protection device according to claim 1, wherein the airbag is held by the lap belt so as to be able to displace a folding completion body formed by folding the bag body with respect to the lap belt.

3. The occupant protection device according to claim 1, wherein the conduit holder is formed of a substantial tube that is able to cover an outer peripheral side of the conduit.

4. The occupant protection device according to claim 3, wherein the conduit holder is formed of a bellows tube made of synthetic resin.

5. The occupant protection device according to claim 3, wherein the conduit holder is formed of a tube in which a mesh reinforcing layer is disposed over an entire circumference of a rubber-like elastic body as a base material.

6. The occupant protection device according to claim 2, wherein
    the seat-side fixing portion is attached to a position on a side of the seat portion via a position adjuster, and
    the position adjuster is configured to be able to slide the seat-side fixing portion along a length direction of the conduit holder with respect to the seat portion.

7. The occupant protection device according to claim 1, wherein
    the airbag includes a belt loop through which the lap belt can be inserted, and
    the bag body-side fixing portion is attached to the belt loop.

8. The occupant protection device according to claim 1, wherein the seat belt and the inflator are mounted on a seat.

9. An occupant protection device disposed on a seat of a vehicle, comprising:
    a seat belt;
    an airbag disposed in a region of a lap belt that restrains a waist of an occupant seated on the seat when the occupant wears the seat belt;
    an inflator disposed at a position near a lower end of a seat portion of the seat and supplies an inflation gas to the airbag; and
    a cover adapted to cover a periphery of the airbag,
    the airbag having a bag shape formed of a flexible sheet, and including
    a bag body that is held by the lap belt in a folded state and inflates to be able to protect the occupant wearing the seat belt, and
    a conduit that is connected to the inflator to allow the inflation gas to flow into the bag body,
    wherein
    the conduit is disposed substantially along the lap belt in a state of being held by a conduit holder, and
    the conduit holder is formed of a material having flexibility and higher rigidity than the conduit, is formed of a substantial tube capable of covering an outer peripheral side of the conduit, and has at least one end side fixed to a seat side or a bag-body side,
    the cover includes a main cover and a conduit-side cover, the main cover is configured to cover an outer peripheral side of the folded bag body and a part of the lap belt, and the conduit-side cover is configured to cover an outer peripheral side of the conduit holder.

10. The occupant protection device according to claim 9, wherein the seat belt and the inflator are mounted on a seat.

11. The occupant protection device according to claim 9, wherein the airbag is held by the lap belt so as to be able to displace a folding completion body formed by folding the bag body with respect to the lap belt.

12. The occupant protection device according to claim 9, wherein the conduit holder is formed of a substantial tube that is able to cover an outer peripheral side of the conduit.

13. The occupant protection device according to claim 12, wherein the conduit holder is formed of a bellows tube made of synthetic resin.

14. The occupant protection device according to claim 12, wherein the conduit holder is formed of a tube in which a mesh reinforcing layer is disposed over an entire circumference of a rubber-like elastic body as a base material.

15. An occupant protection device disposed on a seat of a vehicle, including:
a seat belt;
an airbag disposed in a region of a lap belt that restrains a waist of an occupant seated on the seat when the occupant wears the seat belt;
an inflator disposed at a position near a lower end of a seat portion of the seat and supplies an inflation gas to the airbag; and
a cover adapted to cover a periphery of the airbag,
the airbag having a bag shape formed of a flexible sheet, and including
a bag body that is held by the lap belt in a folded state and inflates to be able to protect the occupant wearing the seat belt,
a conduit that is connected to the inflator to allow the inflation gas to flow into the bag body, and
a belt loop through which the lap belt can be inserted, wherein
the conduit is disposed substantially along the lap belt in a state of being held by a conduit holder, and
the conduit holder is formed of a material having flexibility and higher rigidity than the conduit, is disposed substantially along the conduit, and has both end sides fixed to a seat side and a bag body side, respectively by a seat-side fixing portion or a bag body-side fixing portion,
the cover includes a main cover and a conduit-side cover, the main cover is configured to cover an outer peripheral side of the folded bag body, the belt loop and a part of the lap belt, and the conduit-side cover is configured to cover an outer peripheral side of the conduit holder.

16. The occupant protection device according to claim 15, wherein the seat belt and the inflator are mounted on a seat.

17. The occupant protection device according to claim 15, wherein the airbag is held by the lap belt so as to be able to displace a folding completion body formed by folding the bag body with respect to the lap belt.

18. The occupant protection device according to claim 15, wherein the conduit holder is formed of a substantial tube that is able to cover an outer peripheral side of the conduit.

19. The occupant protection device according to claim 18, wherein the conduit holder is formed of a bellows tube made of synthetic resin.

20. The occupant protection device according to claim 18, wherein the conduit holder is formed of a tube in which a mesh reinforcing layer is disposed over an entire circumference of a rubber-like elastic body as a base material.

* * * * *